DIGITAL COMPUTING SYSTEM

Filed April 5, 1965 8 Sheets-Sheet 1

INVENTORS
ALAN KOTOK
CHESTER G. BELL

BY Blair & Buckles
ATTORNEYS

INVENTORS
ALAN KOTOK
CHESTER G. BELL
BY
Blair & Buckles
ATTORNEYS

INVENTORS
ALAN KOTOK
CHESTER G. BELL
BY
Blair & Buckles
ATTORNEYS

INVENTORS
ALAN KOTOK
CHESTER G. BELL
BY
Blair & Buckles
ATTORNEYS

INVENTORS
ALAN KOTOK
CHESTER G. BELL
BY
Blair & Buckles
ATTORNEYS

INVENTORS
ALAN KOTOK
CHESTER G. BELL
BY
Blair & Buckles
ATTORNEYS

INVENTORS
ALAN KOTOK
CHESTER G. BELL
BY
Blair & Buckles
ATTORNEYS

INVENTORS
ALAN KOTOK
CHESTER G. BELL
BY
Blair & Buckles
ATTORNEY

United States Patent Office 3,376,554

Patented Apr. 2, 1968

3,376,554

DIGITAL COMPUTING SYSTEM

Alan Kotok, Belmont, and Chester G. Bell, Concord, Mass., assignors to Digital Equipment Corporation, Maynard, Mass.

Filed Apr. 5, 1965, Ser. No. 445,565

30 Claims. (Cl. 340—172.5)

ABSTRACT OF THE DISCLOSURE

A digital data processing system of one or more processors, plural input-output devices per processor, and plural memory units connects each input-output device and each memory unit to each processor in parallel so that additional devices and units can be added to a processor on a modular, "plug-in" basis. Each processor enables a selected input-output device transfer data with it, and quickly returns the data conductors to normal condition after each data transfer. The processor also requests service from a single memory unit and is signalled when the request is accepted. Each memory unit selects one of plural simultaneous service requests on a priority basis that can alternate priority levels. Each memory unit is automatically "disconnected" from the memory buss data conductors immediately after completing an information transfer but before completing the memory cycle for the transfer.

This invention relates to the transfer of digital characters within a computing system consisting of storage devices, input-output devices and arithmetic devices or, more generically, processors. More particularly, the invention provides a digital computing system that transfers digital information between the storage devices, inout devices and processors in such a manner that additional devices and processors can be incorporated with ease and, particularly, without changing the existing computing system.

Thus the invention provides a digital data processing system in which each functional area, i.e. storage, input-output, and arithmetic, has a modular arrangement and can hence be readily enlarged.

A prior digital computing system having short-comings resolved with the present invention comprises storage devices, input-output devices and arithmetic devices. These devices are interconnected through a coupling device termed a multiplexer. In addition, control units are required between the input-output devices and the multiplexer. Although each control unit can be connected between several input-output devices and the multiplexer, a control unit can couple only one of its input-output devices to the multiplexer at a time. Thus, a separate control unit is required for each input-output device that requires uninterrupted access to the rest of the computing system. This is a costly requirement and also adds substantially to the complexity of the system.

Accordingly, it is an object of the present invention to provide a digital computing system wherein central processors can have uninterrupted access to each storage device and to each input-output device.

Another object is to provide logically efficient apparatus for transferring digital characters between various elements of a digital data processing system. Particularly, it is an object to provide such apparatus for transferring characters on the one hand between a processor and input-output devices, and on the other hand between the processor and storage devices.

A further object of the invention is to provide a data processing system of the above character in which the apparatus for performing each function can be expanded on a modular basis, that is, in which processors, storage devices, and input-output devices can be added as desired to increase the capacity to perform arithmetic, memory, and input-output functions.

Another objects is to provide a data processing system in which a single processor can time-wise overlap successive operations with different storage devices.

Other objects of the invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

For a fuller understanding of the nature and objects of the invention, reference should be had to the following detailed description taken in connection with the accompanying drawings, in which.

*General description*

Figure 1:
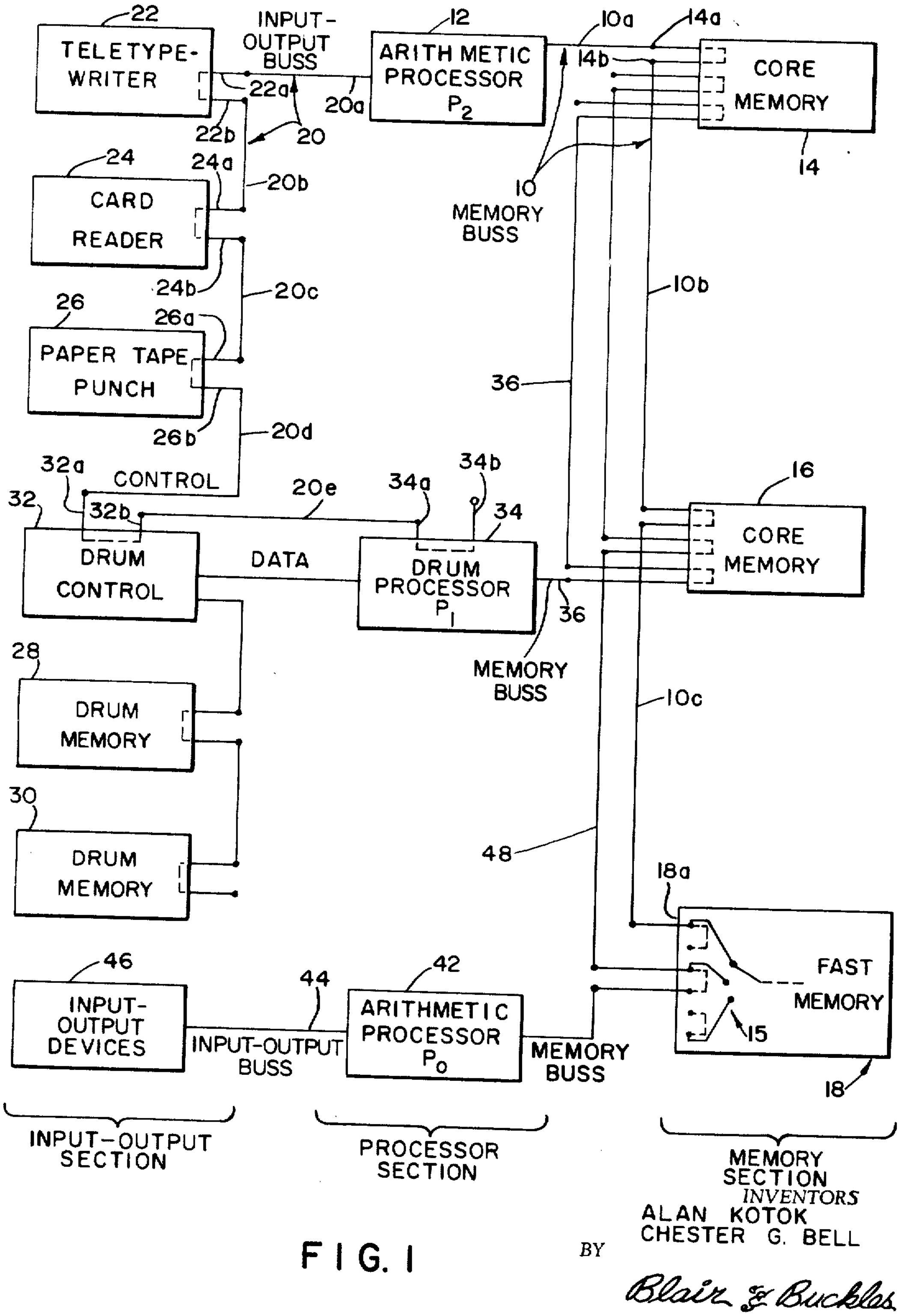
FIG. 1 is a schematic diagram of a data processing system embodying the invention.

The data processing system can be represented in block form as shown in FIG. 1 with three principal operational sections: processor, input-output, and memory. A memory buss 10 connects a arithmetic processor $P_2$ with the memory section, shown as comprising core memories 14 and 16 and a fast memory 18. Connection to the illustrated fast memory is made with a switch 15. An input-output (I/O) buss 20 connects the processor $P_2$ with several I/O devices, such as a card reader 24, a teletypewriter 22 and a paper tape punch 26. The memory buss and the I/O buss carry both control information and data in two directions. The signals are transferred in parallel, as distinguished from serial transmission.

The processor $P_2$ can also control the transfer of data between the memory section and a drum storage system that comprises magnetic drum memories 28 and 30 connected through a drum control 32 to a drum processor $P_1$. The drum processor transfers data between the drum memories 28 and 30 and the memory devices 14, and 16 by means of a second memory buss 36.

As also shown in FIG. 1, the illustrated data processing system includes an arithmetic processor $P_0$ connected via an I/O buss 44 to I/O devices indicated at 46. A memory buss 48 connects the processor $P_0$ to the memory devices 14, 16 and 18.

Considering the connections between the input-output devices and the buss 20 in greater detail, each input-output device 22, 24, 26 and the drum control 32 has a pair of parallel-connected terminals 22*a*, *b*; 24*a*, *b*; 26*a*, *b* and 32*a*, *b*, respectively. The I/O buss, in turn, consists of several sections in series with each other. Thus, a first section 20*a* extends between the processor 12 and the terminal $22a$; in practice the connections to the buss section are made with multiple-contact removable plugs. A second section $20b$ is connected between the card reader terminal $22b$, and the terminal $24a$ on the teletypewriter 24. Similarly, a section $20c$ extends the I/O buss to the paper tape punch 26 and sections $20d$ and $20e$ tie the drum system to the buss.

The memory busses 10, 36 and 48 are connected with the memory devices in the same manner, except that each memory device has several pairs of parallel-connected terminals, one for each buss to which it can connect. Thus the buss 10 has a section $10a$ connected between the processor $P_2$ and a terminal $14a$ on the core memory 14. A buss section $10b$ connects the buss 10 from the terminal $14b$ to the core memory 16, and is in series with a buss section $10c$ extending to the fast memory 18.

With this arrangement, the data processing system can be expanded on an item-by-item basis. An additional I/O device, for example, can be connected to the buss 20 at the terminal $34b$ on the drum processor $P_1$. Additional memory devices in the memory section and additional drum memories can be included in the same manner and additional processors can be connected to the system with an additional memory buss connected to spare terminals on the memory devices 14, 16 and 18.

The system runs asynchronously; it has no master control or timing unit. For example, each memory device has its own timing distributor for scheduling the operation for a full memory cycle. A memory device performing a memory operation signals the participating processor in order to schedule the reading in and reading out of data at the processor end of the memory buss.

*Arithmetic processor*

Figure 2:
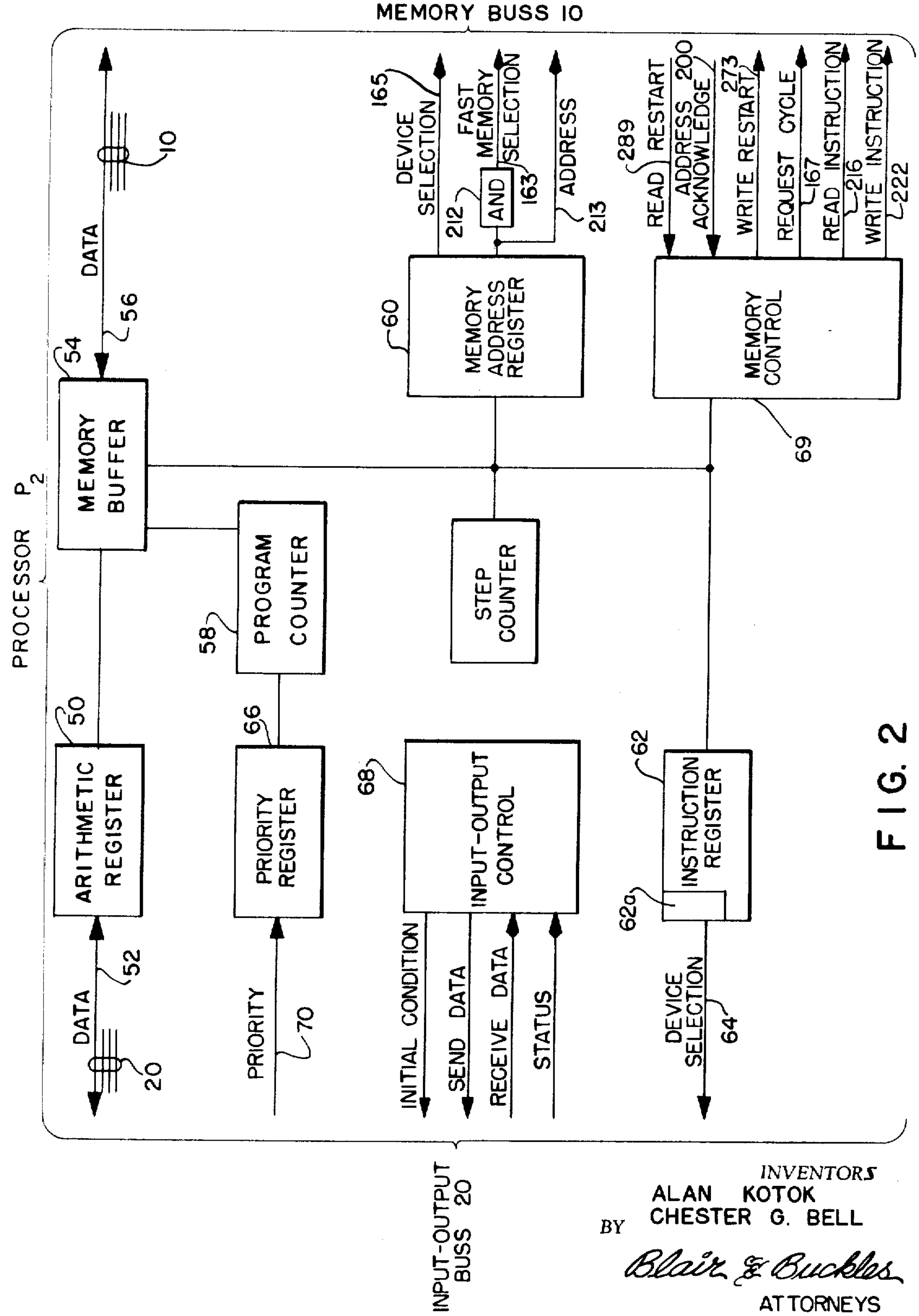
FIG. 2 is a simplified schematic diagram of an arithmetic processor used in the data processing system of FIG. 1.

The arithmetic processors perform the arithmetic and logic operations as well as data transfer functions in the system of FIG. 1. Each one can be constructed as shown in FIG. 2, with an arithmetic register 50 connected to data lines 52 in the I/O buss 20. The register 50 calculates the addresses used in input-output operations, functions as an operand register for logical instructions, and is used in all arithmetic and shift instructions.

A memory buffer 54 connects the arithmetic register to data lines 56 of the memory buss 10. In addition to serving as the buffer communicating with the memory system, the buffer 54 functions as the addend register in arithmetic operations and contains one of the operands in logical operations.

A program counter 58 contains the memory location from which the next instruction in the program being performed is to be taken. A memory address register 60 transfers to the memory buss 10 the memory address, i.e. the device address and the address within the device of a desired memory location.

An instruction register 62 in the processor contains information regarding the instruction being executed. It has I/O selection stages $62a$, connection to I/O selection lines 64 in the buss 10, that contains the identity of any I/O device which may be connected to the processor 12 during the instruction being executed.

The processor 12 also has a priority register 66 and an input-output control 68.

A memory control 69 in the arithmetic processor initiates and receives the control signals that transfer data between the memory devices and the processor. These signals and the circuits with which they operate are described below.

Figure 3:
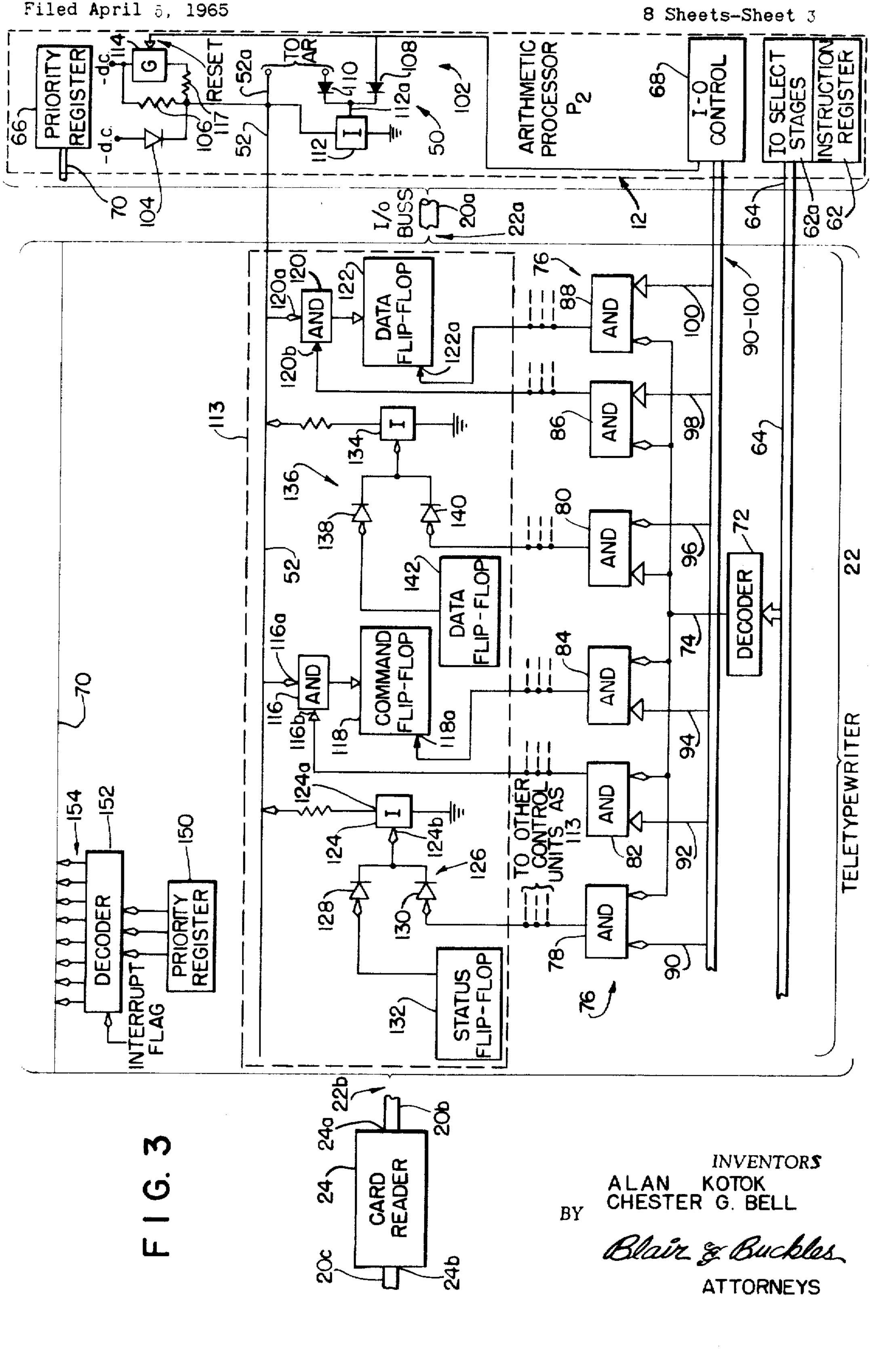
FIG. 3 is a schematic representation of device select and character transfer circuits interconnected with the input-output buss in the data processing system of FIG. 1.

The circuits within the arithmetic processor $P_2$ that terminate the several conductors in the I/O buss 20 are shown in somewhat greater detail at the right side of FIG. 3.

*Input-output devices*

Considered generally, each I/O device 22, 24, 26 and 46 in FIG. 1 can be considered as having a control unit and, for performing its unique function, a function unit.

In a magnetic tape device, the function unit includes the tape transport, and in a teletypewriter the function unit includes the teletypewriter mechanism.

The I/O device control unit is of particular interest here since it is the portion of the I/O device that communicates with the remainder of the data processing system. The function unit communicates with the data processing system only through its control unit.

In the ensuing discussion, the direction of communication is expressed in relation to the processor. Thus, a signal sent by the processor to an I/O device is considered an output signal. Correspondingly, a signal received from an I/O device by the processor is an input signal.

Data are transferred between the arithmetic processor and the I/O devices on the two-way data lines 52 in the I/O buss (FIGS. 2 and 3). At the processor, these lines are connected to the arithmetic register 50. In addition, these same lines carry the binary digits containing instructions for the I/O devices and status information for the processor. With a teletypewriter, for example, the instructions might relate to transmission of data to a remote station. Status information from the teletypewriter can inform the processor that the teletypewriter is busy receiving data from another teletypewriter station and, alternatively, that the teletypewriter is not busy.

The illustrated data processing system employs two successive I/O control signals to transfer each data bit from the data lines to an I/O device. The first control signal, termed "*datao clear,*" prepares the I/O device to accept bits. It is followed by a second output signal, termed "*datao set,*" that causes the I/O device to accept the bits. The *datao clear* and *datao set* signals originate in the I/O control 68 (FIG. 2) of the processor.

In a manner similar to the transfer of data to the I/O devices, each I/O instruction is fed to an I/O device from the data lines 52 in response to two successive signals, termed "*cono-clear*" and "*cono-set,*" from the I/O control 68.

The processor instructs an I/O device to send in status information with a "*coni*" signal, and it sends a "*datai*" signal to the I/O device to instruct it to send in data.

As will now be discussed with particular reference to FIG. 3, the arithmetic processor $P_2$ sends these six I/O control signals to all the I/O devices connected to the I/O buss 20. The processor then instructs only the desired device (or devices) to respond to the signals. For this purpose, the instruction register 62 in the processor sends a coded "*select*" word to all the I/O devices. Only the desired I/O device decodes the select word to produce an "*enable*" signal. In this manner, the I/O device identified by the select word is energized to respond to the control signals from the processor.

When an I/O device has data available for the processor or requires data from the processor, it sends an "*interrupt*" signal to the priority register 66 in the processor. The *interrupt* signal is coded according to the priority level of the I/O device and is accepted or rejected at the processor according to its priority relative to the priority of the operation the processor is currently performing.

FIG. 3 shows the circuits in the control unit of an I/O device and also the arithmetic processor circuits that are connected to the I/O buss 20. Thus, at the right side of the drawing, the processor's priority register 66 is shown connected to I/O buss "*interrupt*" lines 70. Also shown are the "*select*" lines 64 connected to the I/O selection stages $62a$ of the instruction register 62.

In the control unit of each I/O device, e.g. the teletypewriter 22, the device selection lines 64 are connected to the input terminals of a decoder 72 (FIG. 3). The decoder 72 energizes its output conductor 74 only when the *select* signal on the lines 64 corresponds to the code identifying the teletypewriter 22. The conductor 74 then applies the decoder output to condition each of six AND circuits 78–88 in a gating array indicated generally at 76. The array 76 includes one AND circuit for each I/O control signal discussed above.

At the same time control lines 90–100 in the I/O buss 20 conduct the I/O control signals from the control circuit 68 in the processor to the gating circuit 76 in each I/O devices 22, 24 and 26. Thus, as shown in FIG. 3, the line 90 delivers the *coni* signal to an input terminal of each AND circuit 78, the line 92 delivers the *cono set* signal to an input terminal of each AND circuit 82, the line 94 applies the *cono clear* signal to an input terminal of each AND circuit 84, and the lines 96, 98 and 100, respectively, apply the *datai, datao set* and *datao clear* control signals to input terminals of the AND circuits 80, 86 and 88. Thus the coincidence of the appropriate *select* signal with one of these six instructions causes one of the AND circuits 78–88 in the selected I/O device to emit an output signal.

In addition to the selection lines 64 and the control lines 90–100, the illustrated I/O buss 20 has thirty-six data lines 52, one of which is shown in FIG. 3. These conductors carry data to and from the processor, carry information regarding the status of the I/O devices to the processor, and apply the instruction signals to the I/O devices.

As with the other conductors in the I/O buss 20, the same data lines 52 service all the I/O devices connected to the I/O buss. This is indicated in FIG. 2 and on the left in FIG. 3, where the I/O devices 24 and 26 are shown connected to the buss 20 in the same manner as the I/O device 22.

*I/O interface circuit of arithmetic register*

As shown on the right in FIG. 3, each data line 52 is connected to one stage 102 of an interface circuit in the arithmetic register 50. The complete interface circuit has a separate stage, identical with the stage 102, for each data line in the I/O buss 20.

The illustrated interface stage 102 has a resistor 106 connected between the data line 52 and a negative direct voltage. A diode 104 clamps the data line to a lesser negative direct voltage applied to the diode anode. This normally clamps the conductor 52 to the lesser negative D.C. voltage. A pair of diodes 108 and 110 are connected in an AND circuit to apply a negative voltage to the control input terminal 112*a* of an inverter 112 only when both diodes receive assertion (negative) level signals. The diode 108 receives the binary digit to be sent on the line 52 and the control unit 68 applies the instruction to transfer the digit to the line to the diode 110.

In response to the negative voltage developed at its control input terminal 112*a* when, for example, a binary ONE is to be transmitted, the inverter 112 raises the potential of the data conductor 52 from the negative clamping level to ground. When, on the other hand, a binary ZERO is to be sent, the diode 108 does not receive the assertion level and hence the line 52 remains clamped at the negative level.

After the transfer instruction has been applied to the diode 110 in the interface stage 102, the processor instructs a selected circuit in a selected I/O device to sample the potential of the data line 52. This causes the selected I/O circuit to accept, i.e. read in, the binary digit placed on the line 52 at the processor. Immediately thereafter, in the arithmetic processor interface circuit 102, the I/O control 68 applies a *reset* signal to a gate 114 causing it to apply a large negative D.C. voltage to the data line 52 through a resistor 117. The reset voltage discharges the conductor 52, rapidly returning it to the negative potential at which it is normally clamped by the diode 104.

Still considering the stage 102 of the arithmetic register interface circuit, when the processor 12 receives a binary signal from an I/O device, the signal is applied via an input branch 52*a* to the information input terminals (not shown) of the arithmetic register 50. The reset gate 114 is then actuated to make certain that the data line 52 is at its normal negative level before another digit is placed on the data line.

*I/O device control circuits*

With further reference to FIG. 3, for each data line in the I/O buss 20, the illustrated teletypewriter 22 has a separate control unit indicated generally at 113 that can have four connections with its associated data line. To receive an instruction digit from the processor $P_2$, the I/O device has an AND circuit 116, appropriately in the form of a capacitor-diode gate, whose input terminal 116*a* is connected to the data line 52. The other input terminal 116*b* of the AND circuit is connected to the output terminal of the AND circuit 82 in the gating array 76. The output signal from the AND circuit 116 is applied to an input terminal of a command flip-flop 118 that is cleared by the output signal from the AND circuit 84 in the gating array 76.

Similarly, the circuit in the I/O device for accepting data from each data line 52 include an AND circuit 120 having an input terminal 120*a* connected to the conductor 52 and an input terminal 120*b* connected to the output of the AND circuit 86. The output signal from the AND circuit 120 sets a data flip-flop 122; the output signal from the AND circuit 88 clears the flip-flop 122.

As also shown in FIG. 3, to place each binary digit of a word indicating the status of the teletypewriter 22 on the corresponding data line 52, the teletypewriter has an inverter 124 whose output terminal 124*a* is connected to the line 52 through a resistor. The input signal for the inverter 124 is from an AND circuit 126 comprising diodes 128 and 130 having their cathodes connected together to the inverter input terminal 124*b*. The diode 128 is connected to an output terminal of a status flip-flop 132 and the diode 130 receives the output signal from the AND circuit 78.

The circuit used to place a data digit on a data line 52 is similar to the circuit for sending status information to the arithmetic processor. Specifically, the output terminal of an inverter 134 is connected through a resistor to the conductor 52; an AND circuit indicated generally at 136, comprising diodes 138 and 140, develops the input signal for the inverter 134. An output terminal of a data flip-flop 142 is connected to the diode 138, and the output signal from the AND circuit 80 is connected to the other diode 140.

The teletypewriter 22 has a separate control unit of the type just described, i.e. comprising flip-flops 118, 122, 132 and 142; gates 124 and 134; and AND circuits 116, 120, 126 and 136; for each data line 52. These several control units are controlled by a single gating array 76 in the teletypewriter in the manner set forth above.

*Output operation on the I/O buss*

The operation of the I/O device control circuits will now be described with further reference to FIG. 3. An I/O operation involving the arithmetic processor $P_2$ begins with the application of the *select* signal from the I/O selection stages 62*a* in the processor to the decoder 72 in each I/O device 22, 24 and 26 connected to the buss 20.

This *select* signal produces an output signal only from the decoder 72 in each I/O device that is to take part in the I/O operation. When the coding of the *select* signal corresponds to the input conditions for energizing the teletypewriter 22, the output signal from its decoder 72, in the form of a level on the conductor 74, energizes one input terminal of each AND circuit 78–88.

When the I/O operation is to send data from the processor to the teletypewriter after the device *select* signals are dispatched, the I/O control 68 in the processor applies a *datao clear* pulse to the I/O buss line 100. In the teletypewriter 22, this pulse causes the gate 88, conditioned by the level from the decoder 72, to clear the data flip-flop 122.

With the data flip-flops 122 cleared, the teletypewriter is ready to accept the new data. The processor now applies a data signal to each data line 52 that is to carry a binary ONE to the reader. The *datao set* pulse, applied to the command line 98 by the control circuit 68, causes the AND circuits 120 to transfer the ONE on the lines 52 to the corresponding data flip-flops 122. Specifically, the *datao set* pulse causes the already conditioned AND circuit 86 to apply a pulse to the input terminal **120*b* of each AND circuit 120. In response to this signal and the binary ONE signal it receives from the data line 52 (if a ONE is present on the line) the AND circuit 120 applies a pulse to the data flip-flop 122**, thereby setting the flip-flop, i.e. changing it to the ONE state.

The same sequence of operations is used to send each binary digit of an instruction to the teletypewriter. Specifically, after the instruction register 62 applies the *I/O select* signal to the conductors 64, the control circuit 68 applies a *cono clear* pulse to the AND circuit 84 of each I/O device. However, only the AND circuit 84 in the I/O device addressed by the instruction register passes the *cono clear* pulse to the clear input terminals **118*a* of its command flip-flops 118. The AND circuit 82** in the I/O device then receives a *cono set* pulse on the command line 92. This pulse causes the AND circuit 82 to enable the AND circuits 116, which transfer to the command flip-flops 118 the ONE's on the data line 52.

*I/O buss input operation*

When the processor $P_2$ is to receive data from the teletypewriter 22, it again supplies the device's decoder 72 with the appropriate *select* signal from the processor instruction register 62. The I/O control 68 in the processor then applies a *datai* level to the command line 96 connected to the AND cicuits 80. In response to the coincidence of this signal and the output from the decoder 72, the AND circuit 80 in the teletypewriter develops an output signal that reverse-biases the diodes 140 in the AND circuits 136 of the teletypewriter 22.

When a data flip-flop 142 in the teletypewriter contains a binary ZERO, the diode 138 connected to the flip-flop does not receive an input signal. Hence, the inverter 134 connected to the corresponding AND circuit 136 remains disabled and the data line 52 connected to the inverter remains clamped to the negative level. In the processor $P_2$, the arithmetic register records as a binary ZERO this absence of a signal in the duration during which the processor applies the *datai* level to the I/O buss conductor 96.

On the other hand, when a ONE is stored in a data flip-flop 142, the diode 138 connected thereto is reverse-biased simultaneously with the diode 140. This causes the inverter 134 to conduct and raises the potential of the corresponding data line 52 to ground. The arithmetic register 50 records this level as a binary ONE. The data line 52 is the rapidly returned to the negative level by the reset pulse applied to the gate 114 in the arithmetic register 50.

The status of an I/O unit is communicated to the processor in the same manner as the contents of the data flip-flop 142. That is, to transfer the content of a status flip-flop 132 to a data line 52, the processor applies a *coni* signal to the command line 90. The AND circuits 78 and 126 and the inverters 124 operate in the same manner as the AND circuits 80 and 136 and the inverters 134 associated with the data flip-flops 142.

*I/O device service request*

FIG. 3 also shows a priority decoder 152, illustratively constructed as a binary to octal decoder with eight output terminals, and a priority register 150 in the card reader 22. The priority register stores a coded priority designation which the programmer assigns to it and the decoder 152 decodes this priority information. Upon receipt of an *interrupt* signal or flag, the decoder 152 produces a service request or "*priority interrupt*" signal at the one output conductor 154 that corresponds to the priority in the register 150. This conductor, together with the priority conductors from other I/O devices connected to the lines 70 of the I/O buss 20, are applied to the priority interrupt system 66 in the processor $P_2$. (The interrupt signal input to the decoder 152 can, for example, stem from a status flip-flop such as the flip-flop 132 in the teletypewriter's control unit 113 and indicate that the teletypewriter has additional data to send the processor.)

The priority system 66 compares the priority of an incoming interrupt signal with the priority of the program on which the processor is presently operating. Depending on the relative priority of the I/O device initiating the interrupt signal, the processor disregards the request or, alternatively, ceases work on the program in process and services the new request.

The priority designation in the register 150 can be established with the *cono clear* and *cono set* signals described above. In this instance, the command flip-flops 118 of FIG. 3 would constitute the individual stages in the priority register 150.

The processor $P_2$ can also be programmed so that when it receives an interrupt request from an I/O device it can interrogate the status of that device to determine what is causing it to issue the interrupt request. This interrogation will generally involve determining the condition of one or more status flip-flops 132 in the I/O device and will accordingly be carried out as outlined above by means of *coni* signals from the processor.

*Memory system*

The memory portion of the data processing system comprises a number of separate and independent memory devices, each of which includes a data storage section and a control section. Each memory device operates asynchronously with respect to the other memory devices as well as with respect to the arithmetic processors and the in-out devices. The several memory devices can have different storage capacities and different operating speeds. The system of FIG. 1, for example, has three memory devices, a core memory 14 of 16,384-word capacity, a core memory 16 of 8,192-word capacity and a high-speed 16-register flip-flop memory 18.

The memory buss 10, FIG. 1, connects each memory device 14, 16, 18 directly to the arithmetic processor $P_2$, and a separate memory buss 48 connects the same memory devices with another arithmetic processor $P_0$. The memory devices 14 and 16 are also connected to the drum processor $P_1$ with a buss 36.

As discussed below, the processor with which a memory device communicates at any given time is determined by (1) signals the device receives from the processors and (2) a processor priority circuit located in the device.

The fast memory 18, on the other hand, is prewired as with a switch 15 to be associated with only one processor at a time, e.g. the processor $P_2$. Thus, in some installations, it will be desirable for the data processing system to have a separate fast memory for each arithmetic processor.

With this arrangement, each processor has direct access to every memory location in the core memories 14 and 16. Also, since the same memory buss connects each arithmetic processor to all the memory devices with which it can communicate, the system is arranged so that as soon as data placed on the memory buss by either the processor or a memory device is taken off the buss, the buss is available to the processor for carrying other signals to other memory devices. More particularly, an instant after data is transferred between the memory buffer in a memory device and the data lines, and while the memory device is busy transferring the data from its memory buffer to its cores the processor can operate with another memory device. With this operation, the system operates considerably faster than when the processor carries out successive operations with the same memory device.

*The memory device*

In general, each memory device other than the fast memory 18 has, in addition to a storage section, a control section that receives requests for service from each processor with which the device is connected. The processor requests are coded signals identifying a particular memory device. In response to a processor request addressed to a device, its control section initiates a sequence of operations for answering the request. One of these is to compare the priority of the request with the priority of any requests received simultaneously from other processors.

The memory device also responds to instructions from a processor to operate the read and write circuits of its storage section. Further, each memory device sends information regarding the state of its memory cycle to the arithmetic processors.

Figure 4:
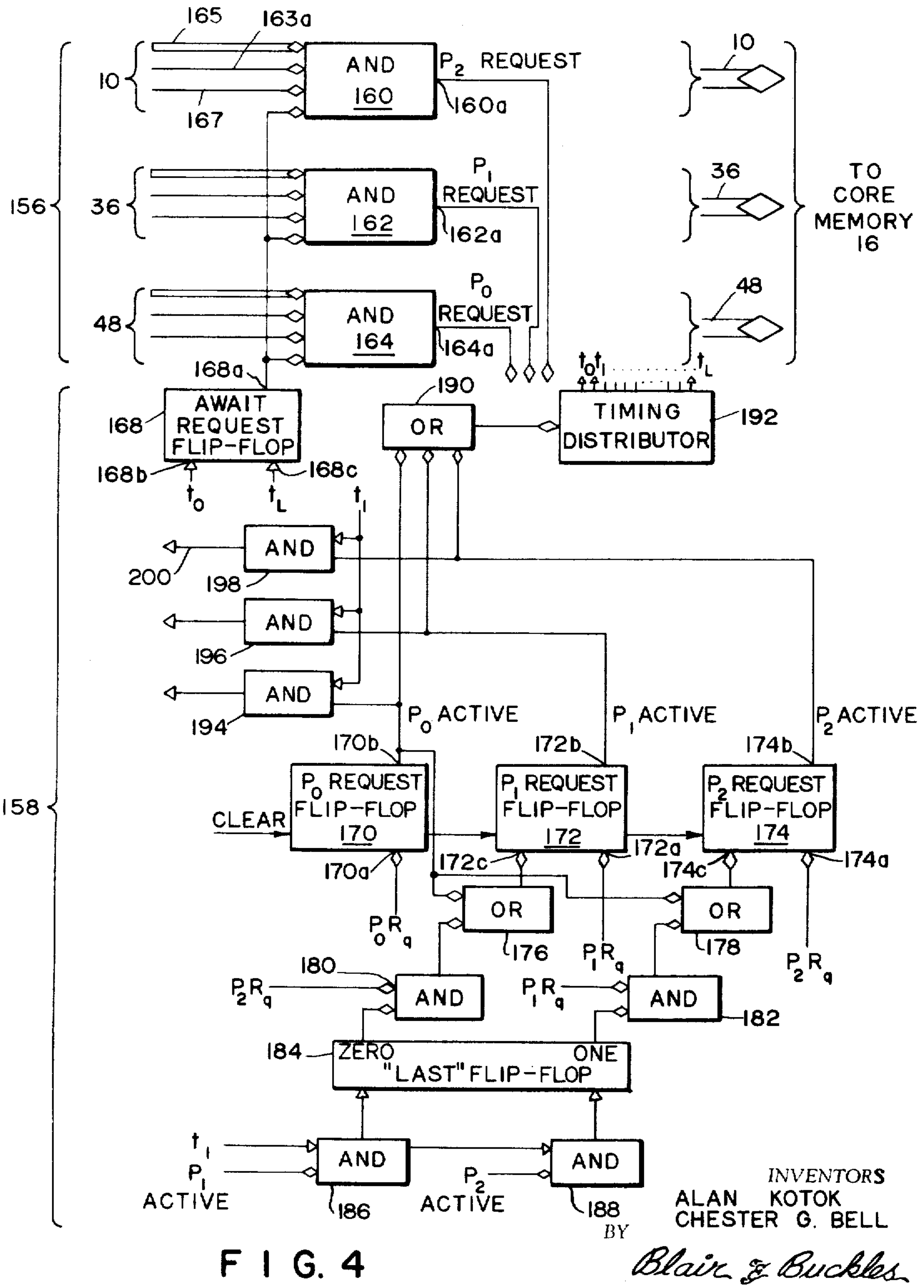
FIG. 4 is a schematic diagram of device select and priority circuits interconnected with the memory buss in the system of FIG. 1.

Turning now to FIG. 4, the core memory 14, for example, includes a processor selection circuit, indicated generally at 156, that receives requests for service from each processor $P_2$, $P_1$ and $P_0$ (FIG. 1). The lower portion of FIG. 4 contains a priority circuit, indicated generally at 158, with which the core memory 14 resolves conflicts produced when more than one processor requests service simultaneously. These circuits 156 and 158 will now be described in detail.

The processor selection circuit 156 has AND circuits 160, 162 and 164, one for each of the processors $P_2$, $P_1$ and $P_0$ (FIG. 1) to which the core memory 14 is connected. The input signals to the AND circuit 160 include device address signals from the memory address register 60 (FIG. 2) of the processor $P_2$, and a *request cycle* signal from that processor's memory control 69. Memory buss lines 165 and 167, respectively carry these signals to the AND circuit 160. For later reference, one line 163*a* is designated as carrying a fast memory selection signal.

A final input to the AND circuit 160 is developed in an "await request" flip-flop 168 in the core memory. The AND circuit 160 develops an output signal, termed *$P_2$ request*, at its output terminal 160*a* in response to a *request cycle* signal plus the set of module address signals identifying the core memory 14, plus a *not fast memory* on the buss line 163a, plus an *await request* flag from the flip-flop 168.

In the same manner as described above for the AND circuit 160, the AND circuit 164 in the processor selection circuit 156 is connected to the arithmetic processor $P_0$ by the memory buss 48 and to the await request flip-flop 168. It produces a $P_0$ request signal at its output terminal 164*a*. The AND circuit 162 is likewise via the buss 36 to the drum processor $P_1$ and to the flip-flop 168.

As mentioned above, it is possible for more than one processor to address the same memory device simultaneously, in which event the device selects one processor to which it will respond. This is done on a priority basis. In the illustrated system, the $P_0$ processor has the highest priority. The priority of the remaining processors $P_1$ and $P_2$ depends on which one the core memory 14 serviced last. That is, if the core memory serviced the processor $P_1$ more recently than the processor $P_2$, then the processor $P_2$ has the second ranking priority and the processor $P_1$ the last, i.e. third, priority rank. Conversely, if the memory 14 serviced the processor $P_2$ more recently than the processor $P_1$, the processor $P_1$ has the second rank priority, ahead of the processor $P_2$.

In the priority circuit 158 (FIG. 4), "processor request" flip-flops 170, 172 and 174 receive the processor $P_0$, $P_1$ and $P_2$ requests at their ONE input terminals 170*a*, 172*a* and 174*a*, respectively.

The flip-flops 170–174 are interconnected so that the flip-flops associated with lower priority processors are set to the ZERO state when a higher priority flip-flop is in the ONE state. For this purpose, the ONE output terminal 170*b* of the $P_0$ request flip-flop 170 is connected through an OR circuit 176, to the ZERO input terminal 172*c* of the flip-flop 172, and, through an OR circuit 178, to the ZERO input terminal 174*c* of the flip-flop 174. With this arrangement, whenever the flip-flop 170 is placed in the ONE condition, the resultant level at its output terminal 170*b* resets the lower priority flip-flops 172 and 174 to the ZERO state.

As indicated above, the priority level of the number 1 and number 2 processors (processors $P_1$ and $P_2$ respectively, in FIG. 1) depends on which one obtained service from the core memory 14 last. The illustrated priority circuit 158 achieves this operation with an AND circuit 180 whose output terminal is connected to a second input terminal of the OR circuit 176 and with a further AND circuit 182 similarly connected with an input terminal of the OR circuit 178. One input signal to the AND circuit 180 is the ZERO output signal from a "last" flip-flop 184 whose ZERO input terminal is connected to the output terminal of an AND circuit 186. Similarily, an AND circuit 188 has its output terminal connected to the ONE input terminal of the "last" flip-flop, and the flip-flop's ONE output terminal is connected to an input terminal of the AND circuit 182.

In addition, the ONE output signal (termed "$P_1$ active") from the $P_1$ request flip-flop 172 is applied to an input terminal of the AND circuit 188 and the AND circuit 186 is connected with the ONE output terminal 174*b* of the flip-flop 174 to receive a $P_2$ active signal.

Consider the operation of the priority circuit when the "last" flip-flop 184 is in the ZERO condition, indicating that processor $P_1$ performed a memory operation with the core memory 14 subsequent to the processor $P_2$ and when both the processors $P_1$ and $P_2$ address the memory 14 simultaneously. Assuming further that the processor $P_0$ is not addressing the memory 14, only the AND circuits 160 and 162 will have output signals. The signal from the AND circuit 162 appears at the ONE input terminal 172*a* of the processor request flip-flop 172 and at an input terminal of the AND circuit 182. The *$P_2$ request* signal from the AND circuit 160 is similarly applied to the ONE input terminal 174*a* of the processor $P_2$ request flip-flop 174 and to an input terminal of the AND circuit 180.

Further, the AND circuit 180 receives an assertion level from the "last" flip-flop 184, which is in the ZERO state, whereas the AND circuit 182 does not receive an assertion level from this flip-flop. Accordingly, the AND circuit 182 does not develop an output signal and hence there are no input signals to the OR circuit 178 connected to the ZERO input terminal of the flip-flop 174. Hence, this flip-flop responds to the processor *$P_2$ request* signal at its terminal 174*a* and assumes the ONE state.

The AND circuit 180, on the other hand, receives signals at both its input terminals and hence applies an input signal to the OR circuit 176. As a result, the processors $P_1$ request flip-flop 172 receives the *$P_1$ request* signal at its ONE input terminal and the OR circuit 176 applies a signal to the ZERO input terminal 172*c*. The state of the flip-flop 172 is hence indeterminate at this juncture.

As also shown in FIG. 4, an OR circuit 190 has a different input terminal connected to the ONE output terminal of each of the flip-flops 170, 172 and 174. The OR circuit 190 responds to the *active* signal from one of the flip-flops 172 and 174 to actuate to a timing distributor 192. In the illustrated scheme, this signal from the OR circuit also serves as the first timing pulse $t_0$ of the memory cycle for the core memory 14. It is applied to the ZERO input terminal 168*b* of the await request flip-flop 168, thereby removing the *await request flag* from the AND circuits 160, 162 and 164. These AND circuits are now disabled, and cannot respond to further processor request signals until the flip-flop 168 is again placed in the ONE state. The flip-flop 172 now no longer receives the $P_1$ request level, and the level at its ZERO input terminal 172*c* places it in the ZERO state. The flip-flop 174, however, remains in the ONE state.

As a result, within a brief interval after the AND circuits 162 and 164 develop the $P_2$ and $P_1$ *request* signals, and before the timing distributor 192 develops the $t_1$ pulse, only the processor $P_2$ request flip-flop 174 is in the ONE condition, and hence developing an *active* signal. The remaining flip-flops 170 and 172 are in the ZERO state.

Now that the device selection circuit 156 and the priority circuit 158 have responded to the highest priority request received from a processor, as manifested with an *active* signal output from only one processor request flip-flop, the memory device 14 informs the processor $P_2$ that its request for service has been accepted. As shown in FIG. 4, this is accomplished by connecting the ONE output terminal of each flip-flop 170–174 to a separate AND circuit 194, 196 and 198 and pulsing all of the AND circuits simultaneously with the timing pulse $t_1$ from the distributor 192. Since only the flip-flop 174 has an output signal, only the AND circuit 198 is enabled. The resultant output signal from this AND circuit is delivered via a line 200 in the memory buss 10 (FIG. 1) to the memory control 69 in the processor $P_2$ as an *address acknowledge* signal.

Continuing the above example where the flip-flop 174 has developed a *$P_2$ active* signal, the coincidence of this signal and the $t_1$ pulse operate the AND circuit 188 in the priority circuit 158 to place the "last" flip-flop in the ONE state, thereby storing the fact that the memory device 14 will have now serviced the processor $P_2$ more recently than the processor $P_1$. Hence, the priority circuit 158 is now set with the processor $P_1$ having a higher priority than the processor $P_2$.

At the end of the memory cycle for the memory device 14, the last timing pulse, $t_L$, from the distributor 192 sets the await request flip-flop 168 to the ONE condition, causing it to develop the *await request flag* that conditions the AND circuits 160, 162 and 164. As discussed below, signals developed during the memory cycle clear each flip-flop 170–174, placing it in the ZERO condition. Thus, at the end of the memory cycle, the circuits of FIG. 4 are ready to respond to new requests from the processors.

It should be noted that the above operation is asynchronous. That is, once a set of memory device *address* and *request* signals are received from a processor, the operation of the memory device circuits shown in FIG. 4 depends only on its internal timing distributor 192.

*Addressing the fast memory*

In the illustrated data processing system, the fast memory 18 (FIG. 1) contains the first sixteen memory addresses to which the processor $P_2$ has access. This operation is desirable, for example, where the memory registers at the first sixteen memory addresses function as accumulators for the arithmetic processor $P_2$. These registers are essentially in constant use. It is therefore generally economical to provide them with faster operation than is available with core registers and for this reason the fast memory 18 is used instead of the first sixteen core registers in the core memory 14. However, as will be pointed out below, these sixteen magnetic core registers can nevertheless be selected in place of the fast memory 18 for special programs.

Figure 5:
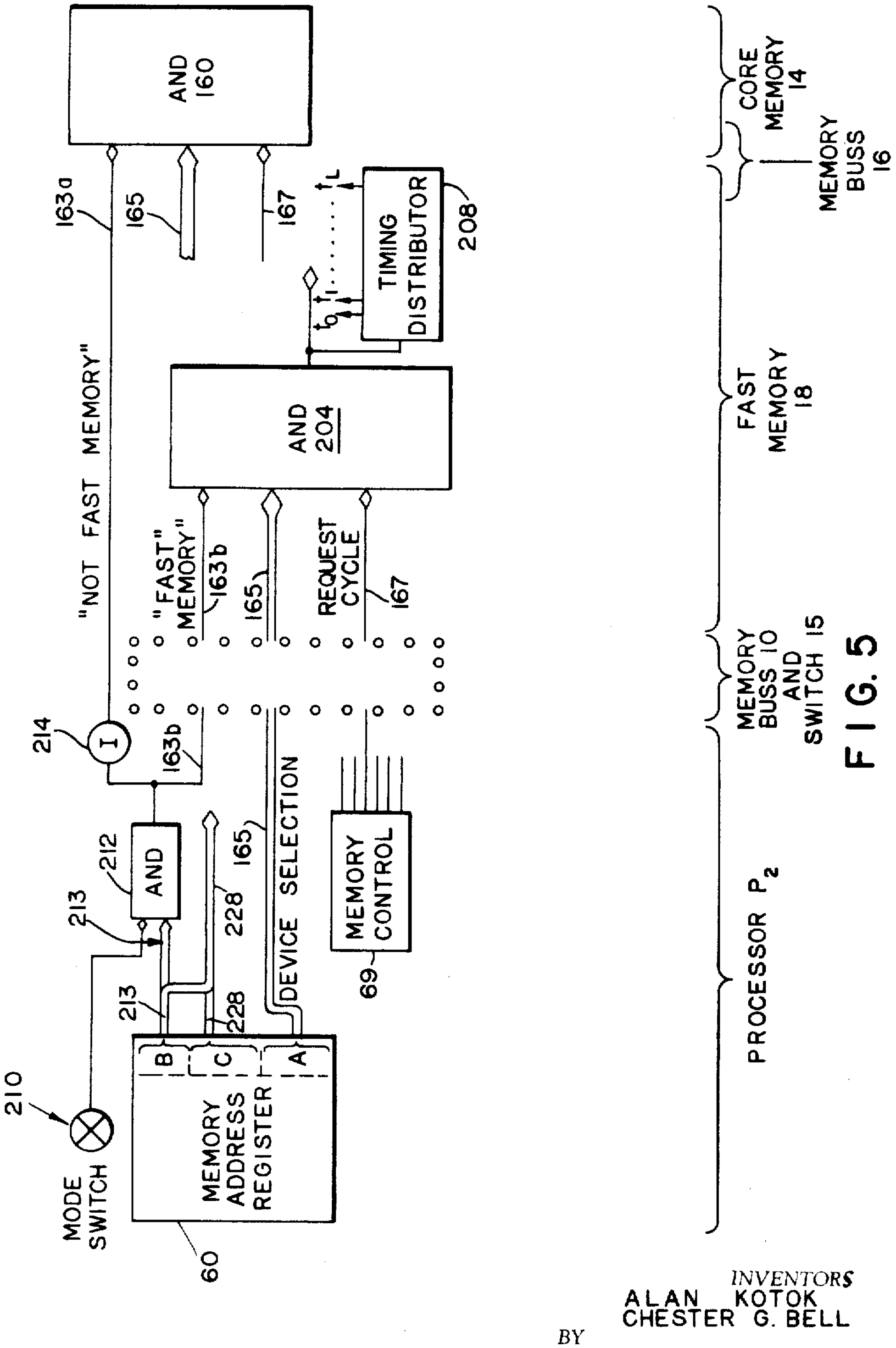
FIG. 5 is a schematic diagram of the processor and storage device select circuits for selecting the fast memory of FIG. 1.

In general, the processors address a memory location with a series of digits which can be considered as comprising three groups. In FIG. 5, these groups of digits are indicated in the memory address register 60 with the designation A, B and C. The first group of digits designated in FIG. 5 as group A is a "device selection" signal and identifies the memory device that contains the selected location. The second group of digits (group B) identifies which, if, any of the first sixteen memory registers within the memory device is being addresses. The third, C, group of digits in the memory address series, together with the second group, identifies a memory register other than one of the first sixteen registers. As discussed above, in the buss 10, the first group of digits is applied to the memory devices 14, 16 and 18 via the memory buss lines 165, FIGS. 2 and 4, and in each memory device is applied to the FIG. 4 AND circuit 160. The second and third groups of digits together constitute the address within the selected memory device and, in the memory buss 10, are conducted to the memory devices by lines 213 and 228, respectively (FIG. 2).

The fast memory selection with the second group of address signals will now be examined with particular reference to FIG. 5, which shows the circuits in the processor $P_2$ and fast memory 18 which initiate a fast memory operation. The AND circuit 160 in the core memory 14 (FIG. 4) is also shown.

As with the memory buss connections shown in FIG. 4 for the core memory 14, an AND circuit 204 in the fast memory 18 is connected to the memory buss 10 lines 165 carrying device *selection* signals from the memory address register 60 in the processor $P_2$. Also, the memory buss line 167 carrying the *request cycle* signal from the processor's memory control 69 is connected to the AND circuit 204. The fast memory 18 also includes a timing distributor 208 that produces a sequence of timing pulses for a fast memory cycle upon receipt of the output signal from the AND circuit 204.

The device address of the fast memory 18 and of one core memory, such as the core memory 14, are preferably the same. Thus the AND circuit 160 in the core memory 14 and the AND circuit 204 in the fast memory preferably respond to the same *device selection* signals.

In addition to the *device selection* signal on lines 165, the core memory 14 and the fast memory 18 also receive a further address signal, termed "*fast memory select*," on memory buss lines 163*a* and 163*b*. Although these lines can carry the same signal, in the illustrated arrangement the line 163*a* carries the complement of the signal on the line 163*b*. The arithmetic processor 12 produces the *fast memory select* signal with an AND circuit 212 that receives from the processor's memory address register 60 the address lines 213 conducting the second group of memory address signals, i.e., the signals that identify whether one of the first sixteen memory registers is being addressed.

The AND circuit 212 in the processor also receives the output signal from a "mode" switch 210 in the processor. The switch, indicated in schematic form only, is used to determine whether the processor $P_2$ is to use the first sixteen memory registers of the fast memory 18 or, alternatively, the first sixteen registers in the core memory 14.

The *fast memory select* signal is applied to the fast memory AND circuit 204 via the buss line 163*b* and, after inversion by an inverter 214 in the processor, to the core memory AND circuit 160 on the line 163*a*. The signal is developed only in response to an address identifying one of the first sixteen memory locations plus a *fast memory* signal from the switch 210, indicating that the fast memory is to be used. The *fast memory select* signal enables the fast memory AND circuit 204 and, conversely, disables the AND circuit 160 in the core memory 14. In the event that the mode switch 210 is set to the "not fast memory" position, the output condition of the AND circuit 212 disables the AND circuit 204 and enables the core memory AND circuit 160.

With this arrangement, when the processor $P_2$ addresses a memory register that is not in the fast memory 18 or in the core memory 14, the AND circuits 204 and 160 in these memory devices do not emit *$P_2$ request* signals. When the processor $P_2$ addresses a register in the core memory 14 other than one of the first sixteen therein, the core memory AND circuit 160 emits a $P_2$ request signal, but due to the absence of a signal from the processor AND circuit 212, the fast memory AND circuit 204 does not emit such a signal.

The fast memory AND circuit 204 emits a $P_2$ request signal only when the mode switch 210 is in the "fast memory" condition, and the *device selection* signals address the core memory 14, and one of the first sixteen registers therein is addressed.

*Transferring instructions to a memory device*

Referring again to the memory devices that are connected with several memory busses, such as the core memories 14 and 16, the manner in which a single location or register in such a memory is addressed will now be described with particular reference to FIG. 6. The discussion will continue the foregoing example wherein processor $P_2$ is active, i.e. carrying out a memory operation.

Figure 6:
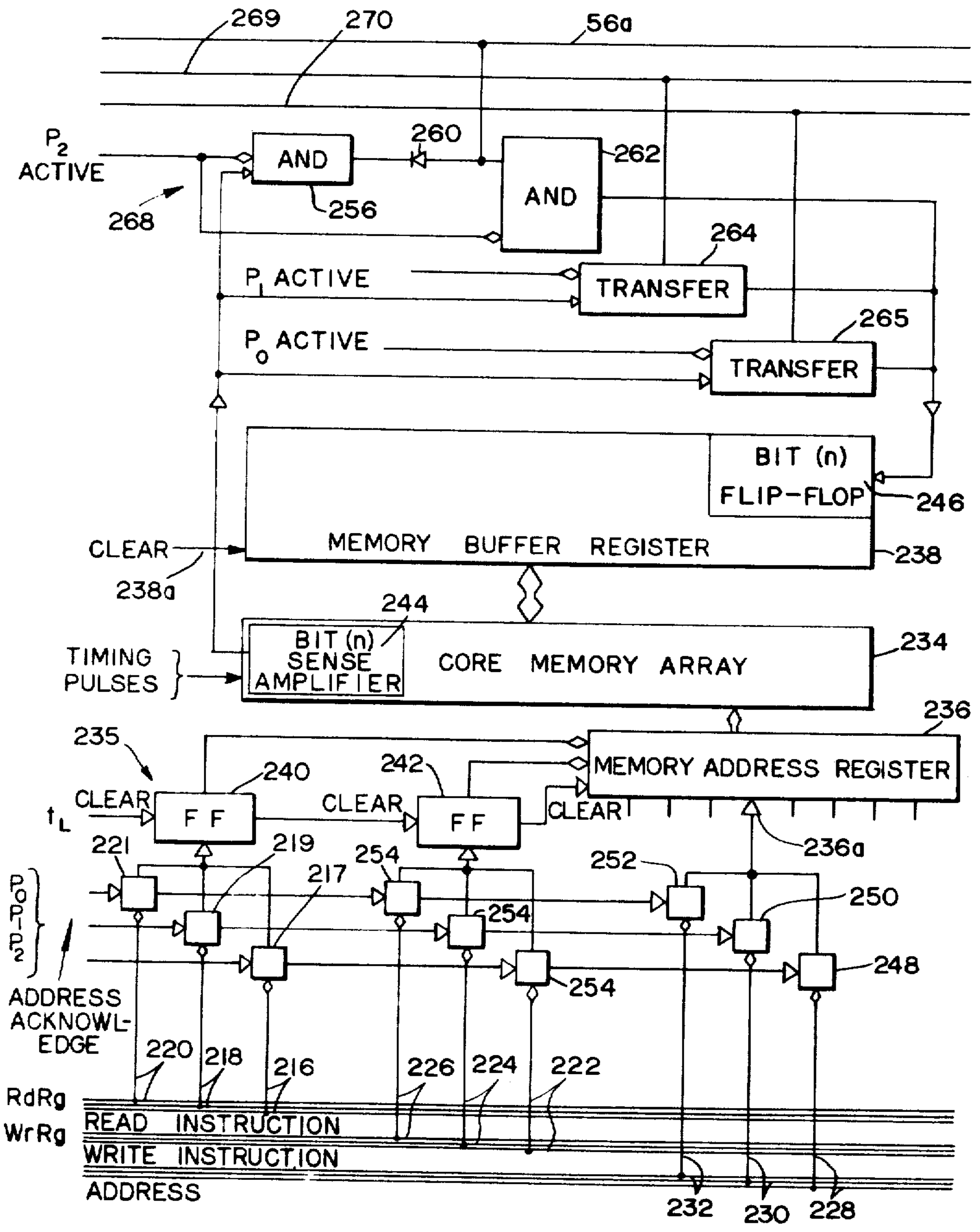
FIG. 6 is a schematic diagram of the character transfer circuits in a storage device connected with the memory buss of FIG. 1.

As shown in FIG. 6, the core memory 14 may have a conventional construction with a core array 234 connected to a memory address and instruction register indicated at 235 and a memory buffer register 238. The memory address and instruction register includes a conventional memory address register 236 connected with two flip-flops 240 and 242 which hold information as to whether a read operation or a write operation is to be performed. For subsequent reference, the sense amplifier 244 for a representative bit ($n$) and the bit ($n$) flip-flop 246 are shown in the core memory array 234 and in the memory buffer register 238, respectively.

As shown in the lower part of FIG. 6, the memory device 14 receives read instructions from the processors 12, 34 and 42 on separate memory buss lines 216, 218 and 220, respectively. Likewise, write instructions from these processors are delivered to the core memory 14 on lines 222, 224 and 226, respectively.

To select the read instruction from the single active processor, the signals on the read instruction lines 216, 218 and 220 are applied to different AND circuits 217, 219 and 221, respectively. The other input to each AND circuit is the *address acknowledge* signal for the corresponding processor. Thus, the AND circuit 217, connected to the read instruction line 216 of the $P_2$ processor, receives the *$P_2$ address acknowledge* signal. Likewise, the AND circuits 219 and 221 receive the $P_1$ and *$P_0$ address acknowledge* signals, respectively.

The output terminals of the AND circuits 217, 219 and 221 are connected in parallel to an input terminal of the read flip-flop 240. The flip-flop output terminal, in turn, is connected to the memory address register 236.

The write flip-flop 242 is connected in the same manner with the output terminals of three AND circuits indicated at 254. Each of these AND circuits receives the *address acknowledge* signal and, from one of the lines 222, 224 and 226, the write instruction associated with the same processor.

The address, within the core array 234, of the register of cores into which data is to be written or from which data is to be read is specified by the address signals produced in the memory address registers of the processors. Each digit of the address is transferred into the memory address register 236 of the core memory 14, from the active processor, in the same manner as the read and write instructions are fed into the memory's flip-flops 240 and 242.

Thus, the active processor ($P_0$, $P_1$, or $P_2$, FIG. 1) sends one digit of an address to the core memory on the processor's memory buss line (228, 230 or 232).

An AND circuit 248 receives the address digit on the line 228, together with the processor *$P_2$ address acknowledge* signal, AND circuits 250 and 252 are likewise connected with the address lines 230 and 232, respectively, and with the sources of the corresponding *address acknowledge* signals. The output terminals of these AND circuits 248, 250 and 252 are applied in parallel to an input terminal 236*a* of the memory address register.

The other address lines in the memory busses 10, 36 and 48 are linked with the memory address register 236 in the same manner as the lines 228, 230 and 232.

As described about with reference to FIG. 4, when the device selection and priority circuits 156 and 158 have identified the highest priority processor requesting service in the core memory 14, the timing pulse $t_1$ of the memory cycle produces the *address acknowledge* signal. With the foregoing arrangement for the address lines and the read and write instruction lines in the core memory 14, this signal enables the AND circuits 217, 219, 221, 248, 250, 252 and 254 to transfer to the memory address register 236 and to the read-wire flip-flops 240 and 242 the information on the address lines and the read and write instruction lines in the memory buss of the processor $P_2$.

*Data transfer with a memory device*

As also shown in FIG. 6, the core memory 14 receives a bit ($n$) of data from the arithmetic processor $P_2$ on a data line 56*a* in the memory buss 10, or alternatively transmits the bit to the processor by way of this data line. A transfer circuit indicated generally at 268, for use with a data signal having a negative-going assertion level (binary ONE), transfers the data bit on the line 56*a* to the memory buffer register 238. The circuit 268 comprises an AND circuit 256 in series with an isolating diode 260 having its anode terminal connected to the data line. The bit ($n$) sense amplifier 244 in the core memory array 234 is connected to one input terminal of the AND circuit 256. The second AND circuit input terminal receives the processor $P_2$ *active* signal. This is the ONE output level from the priority flip-flop 174 in FIG. 4, and it is also applied to an input terminal of a further AND circuit 262 whose other input terminal is connected directly to the data line 56*a*. The output signal from the AND circuit 262 is applied to an input terminal of the bit ($n$) flip-flop 246 in the memory buffer register 238.

As also shown in FIG. 6, the bit ($n$) sense amplifier 244 and the flip-flop 246 are also connected in an identical manner through transfer circuits 264 and 265 to bit ($n$) data lines 269 and 270, respectively, from the processors 34 and 42 (FIG. 1). The transfer circuits 264 and 265 are identical to the transfer circuit 268 except that the transfer circuit 264 receives the $P_1$ *active* signal and the transfer 265 receives the *$P_0$ active* signal.

The memory cycle for the core memory 14 can execute three different instructions, viz "read only," "write only" and "read/write." In a write only instruction, resulting when the write flip-flop 242 (FIG. 6) receives an instruction signal and the read flip-flop 240 does not, the processor delivers the data to the core memory early in the memory cycle. At the memory, the AND circuit 262 in the transfer circuit 268 is already enabled by the *$P_2$ active* signal (developed with the timing pulse $t_1$) and thus it applies the data bit ($n$) on line 56*a* to the memory buffer register 238.

Figure 7:
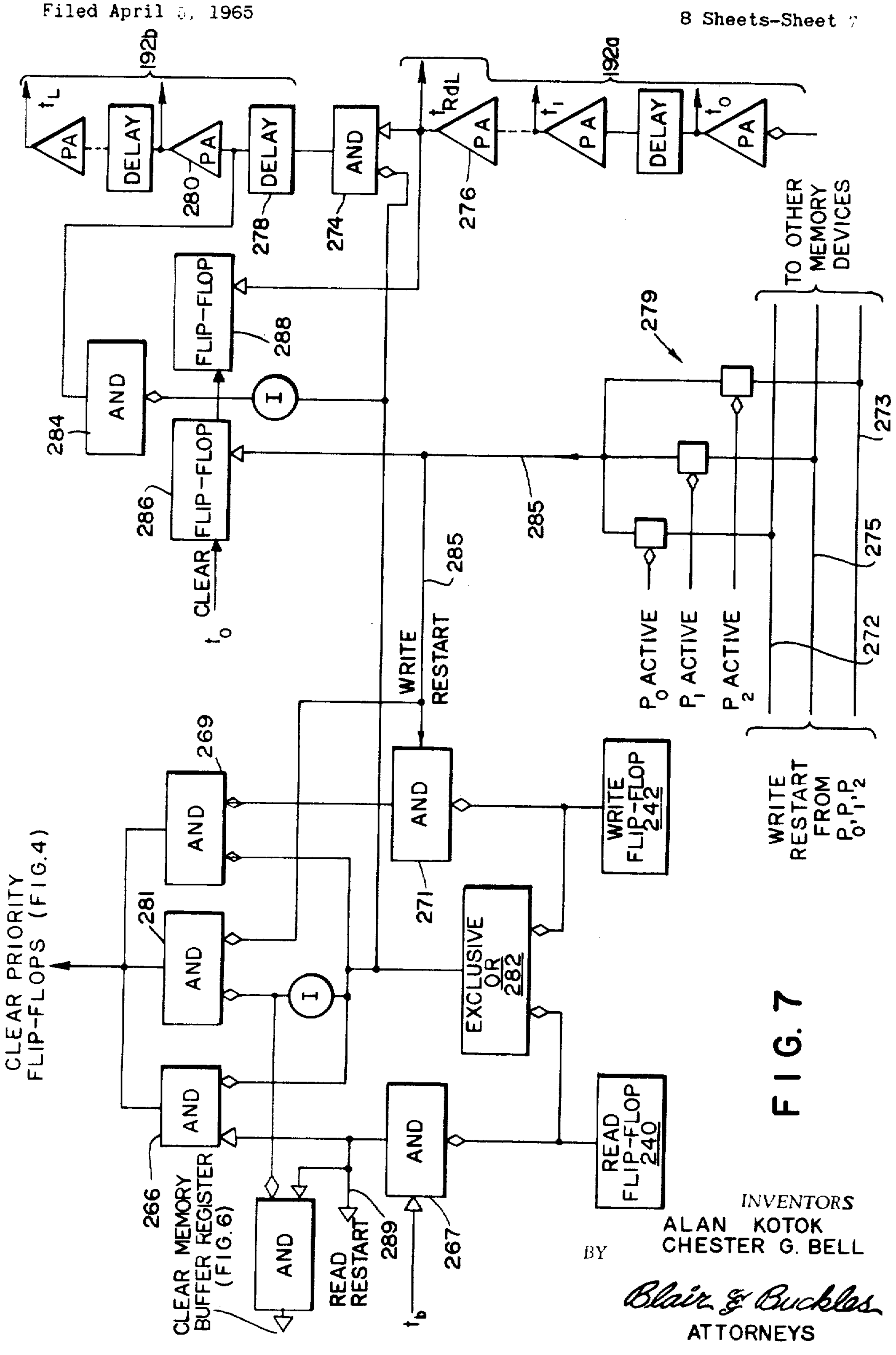
FIG. 7 is a schematic diagram of a portion of a timing distributor for the system of FIG. 1.

The processor $P_2$ also sends a *write restart* pulse (WrRs) to the core memory on a memory buss line 273 (FIG. 7). The memory is also connected with *write restart* lines 275 and 277 from the $P_1$ and $P_0$ processors. A gating circuit 279 (FIG. 7), similar to the FIG. 6 AND circuit 254 receives the signals on these lines and, with a single *active* signal from the FIG. 4 priority circuit, receives only the *write restart* signal from the processor with which it is transferring data. The output conductor 285 from the gating circuit 279 applies the selected *write restart* signal to a further gating circuit in FIG. 7. When a memory device receives a *write restart* signal, it writes into its core array the data in its memory buffer register.

As far as the processor is concerned, as soon as it sends out the data and *write restart* pulse, the "write only" memory operation is complete and the processor can proceed to the next instruction. However, the core memory still has to clear the cores in the array 234 and then write the newly received word from its buffer register into the cores. This is done in the remainder of the memory cycle.

In order to "disconnect" the core memory 14 from the data lines of the memory buss, the $P_2$ *active* signal must be removed. This is done by clearing the priority flip-flops 170, 172 and 174 (FIG. 4) as described below.

During a "read" instruction and during a "read/write" instruction, a timing pulse $t_b$ from the FIG. 4 timing distributor 192 strokes the sense amplifiers 244 in the core memory array to transfer the data from memory to the data lines in the memory buss connected with the active processor.

As shown in FIG. 7, the timing pulse $t_b$ is also applied to an AND circuit 267 that is enabled when the flip-flop 240 holds a "read" instruction. The output signal from the AND circuit 267 is a *read start* (RdRs) pulse that is delivered to the processor, signalling it that data is being sent from the memory device.

Referring again to FIG. 6, in a "read only" cycle, data is transferred to the data lines for transmission to the processor by passing it through the respective AND circuits 256 and the isolating diodes 260. With many conventional arrangements of the core memory, a word read out of it is no longer stored therein. However, as shown in the transfer circuit 268, the input to the AND circuit 262 is connected to the anode of the diode 260. Hence, when the data bit (*n*) is read out of the memory array and placed on the data line **56*a*, it is also automatically applied to the AND circuit 262 and thereby transferred back to the memory buffer register 238**.

Subsequent timing pulses from the timing distributor 192 re-write the data into the memory array. Hence, at the end of a"read only" operation, the memory array stores the same data it contained at the beginning of the cycle.

In a "read only" operation, the processor, however, is finished operating with the memory device as soon as the data placed on the memory buss by the device arrives at the processor. Hence, the memory device can disconnect itself from the data lines immediately after its memory cycle has progressed to the $t_b$ timing pulse. Accordingly, the priority flip-flops (FIG. 4) are cleared at that time. This is done, as shown in FIG. 7, with an exclusive OR circuit 282, connected with the ONE output terminals of the write flip-flop 240 and the read flip-flop 242, discussed above in greater detail with reference to FIG. 6. The exclusive OR circuit is a logic circuit that develops an output signal when it receives a signal at either of its input terminals but not when it receives two input signals simultaneously. The output terminal of this circuit is applied to an input terminal of an AND circuit 266 and an input terminal of an AND circuit 269. The output terminals of the AND circuits are applied to the clear terminals of the priority flip-flops 170, 172 and 174 (FIG. 4).

The other input signal to the AND circuit 266 is the *read restart* pulse from the AND circuit 267. Thus, during a "read only" instruction, the flip-flop 240 enables the AND circuit 266 through the exclusive OR circuit to clear the priority flip-flops upon receipt of the timing pulse $t_b$.

As also shown in FIG. 7, in a "write only" operation, the flip-flop 242 enables and AND circuit 271 that receives the *write restart* pulse from the gating circuit 279. The AND circuit 269 passes the output signal from the AND circuit 271 to clear the priority flip-flops except during a combined read/write instruction.

During such a combined instruction, on the other hand, an AND circuit 281, also shown in FIG. 7, clears the priority flip-flops in response to the absence of an output signal from the exclusive OR circuit, combined with a *write restart* pulse.

*Read/write operation*

Present day computer programs often call for a word to be read out of memory and be operated on by the processor, and then for the altered word to be read into the same memory location that stored the original word. This operation conventionally requires a full memory cycle for the initial read operation, plus a second complete memory cycle to write the altered word into the same memory location.

With the present data processing system, on the other hand, this same operation can be accomplished with a single memory cycle as will now be described. The timing distributor 192 (FIG. 4) conventionally employs a series chain of alternate delay circuits and pulse amplifiers.

As indicated in the FIG. 7 representation of a fragment of the timing distributor 192, the delay circuits and pulse amplifiers therein can be considered as arranged in two successive sections **192*a* and 192*b*. The sequence of pulses from the first section 192*a*** causes the memory device to accept address and instruction signals from the processor and to read out data.

In response to the timing pulses from the second section **192*b*, the memory device writes data into the core memory array 234** (FIG. 6).

As also shown in FIG. 7, to perform both a read operation and a write operation during a single memory cycle, the timing distributor chain is interrupted with an AND circuit 274 connected between the pulse amplifier 276 in the section **192*a*, i.e. whose output timing pulse $t_{(RdL)}$ is the last timing pulse for the read portion of a complete memory cycle, and the subsequent delay circuit 278 at the beginning of the section 192*b*. (The delay circuit 278 can in some cases be omitted so that the AND circuit 274 is directly between the pulse amplifiers 276 and 280.) Thus one of the two input signals to the AND circuit 274 is the last timing signal for the read portion of the memory cycle. The other input signal is the output signal from the exclusive OR circuit 282**.

In a *read only* and in a *write only* memory cycle, only one of the flip-flops 240 and 242 is in the ONE state and hence the exclusive OR circuit 282 develops an output signal that enables the AND circuit 274 to pass the output pulse from the amplifier 276 to actuate the second section **192*b*.**

However, when the programmer wishes to perform a combined read/write memory operation, the processor memory control 69 (FIG. 2) is programmed to develop both a *read* instruction, on the FIG. 6 line 216, and a *write* instruction, on the FIG. 6 line 222, at the beginning of the memory cycle. As a result, both flip-flops 240 and 242 are in the ONE state and apply signals to the exclusive OR circuit 282. This disables the circuit 282 so that the AND circuit 274 does not produce an output signal. As a result, the sequence of operations in the timing distributor stops after the timing pulse $t_{RdL}$ is developed.

The operation of the timing distributor is then restarted in response to the output signal from an AND circuit 284, also shown in FIG. 7, connected to receive the output signals from flip-flops 286 and 288. These flip-flops are cleared to the ZERO state with the timing pulse $t_0$ of each memory cycle. Thereafter, the last timing pulse of the read portion of the memory cycle, i.e. the output from the pulse amplifier 276, sets the flip-flop 288 to the ONE state. A *write restart* signal from the processor sets the flip-flop 286 to the ONE condition; the processor transmits this signal when it has finished operating on the data word it received from the core memory 14 during the read portion of the memory cycle and is ready to write the changed word in the same memory location.

Hence, the AND circuit 284 develops an output signal only when the flip-flop 286 receives a *write restart* pulse after the last timing pulse of the read portion of the memory cycle. The AND circuit output signal actuates the pulse amplifier 280, whose output is $t_{Wr0}$, the first timing pulse in the *write* portion of the memory cycle. This timing pulse and succeeding ones from the timing distributor cause the altered word to be written back into the core memory array 234 at the address stored in the memory address register 236. However, in order to write the altered word from the processor into memory other than the original word read out of memory earlier in the memory cycle, the original word must be cleared from the memory buffer register 238. This is accomplished by applying the output signal from the exclusive OR circuit 282 of FIG. 7 to the clear input terminal 235*a* (FIG. 6) of the register 238 so that the register is cleared when the exclusive OR circuit receives input signals from both the read and the write flip-flops 240 and 242.

Thus, with further reference to FIG. 7, in the timing distributor, the AND circuit 274 immediately passes the timing pulse $t_{RdL}$ to the section 192*b* when the flip-flops 240 and 242 store either a *read only* or a *write only* instruction. The AND circuit 284, on the other hand, passes the pulse $t_{RdL}$ to the second section only in response to a *write restart* pulse received from the processor during a combined read/write operation.

Figure 8:
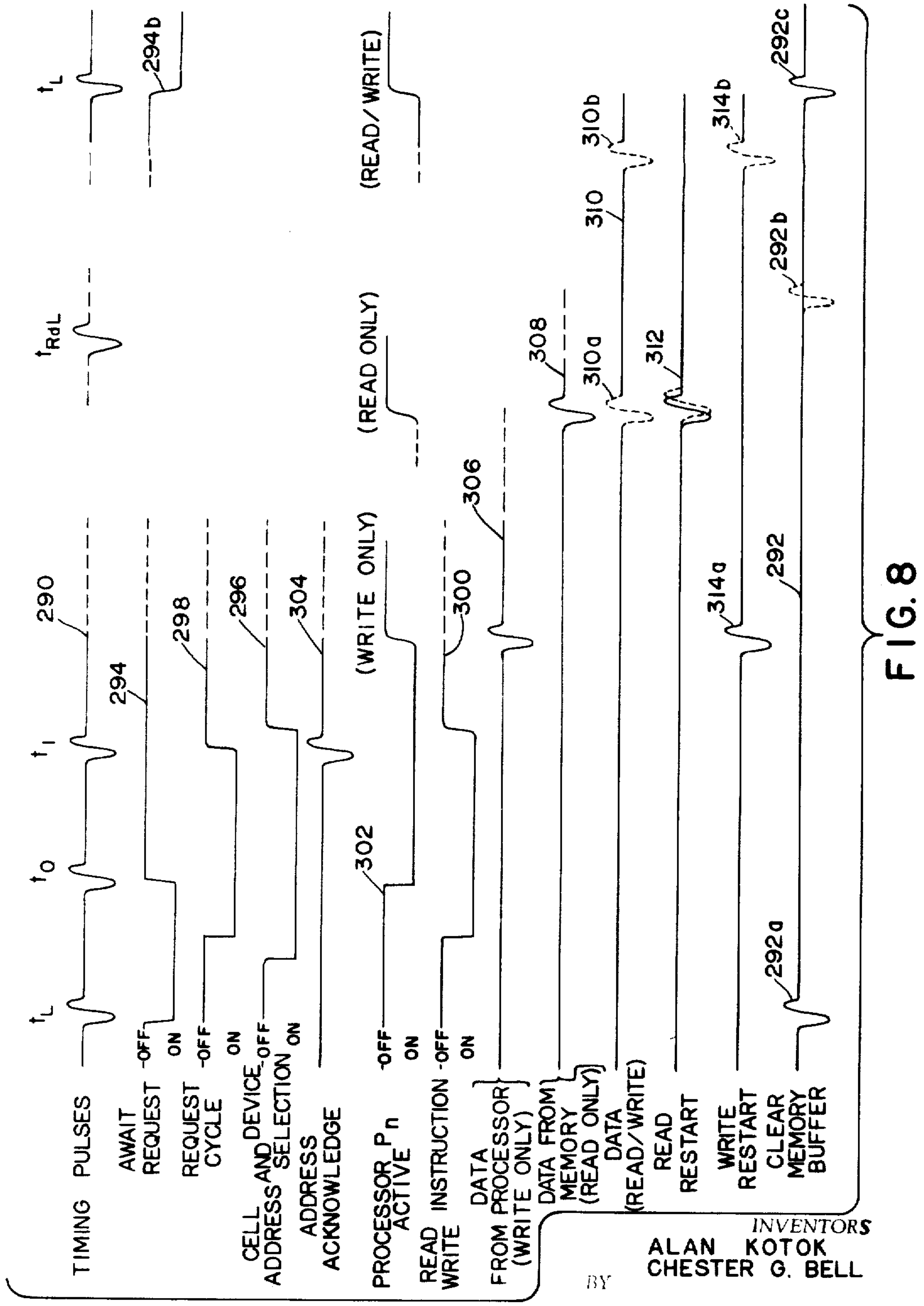
FIG. 8 is a graph of signals developed during memory operation with the system of FIG. 1.

*Timing chart, FIG. 8*

The full memory cycle of core memory 14, illustrative of memory devices in general for use in the present data processing system, will now be summarized with particular reference to the timing chart of FIG. 8, where the horizontal axis represents time, although not necessarily to scale. The illustrated timing sequence commences with the end of a memory cycle, indicated with the left-most timing pulse $t_L$ in the top waveform 290, which represents some of the timing pulses from the timing distributor 192 (FIG. 4). This timing pulse clears the memory buffer register 238 (FIG. 6) in the memory device as indicated with the pulse 292*a* in the waveform 292 at the bottom of the drawing. The pulse $t_L$ also clears the await request flip-flop 168 (FIG. 4) to the ZERO state as indicated with the waveform 294 and, although not shown in the timing chart, clears the read and write flip-flops 240 and 242 (FIGS. 6 and 7).

The next memory cycle is initiated when a processor such as the arithmetic processor $P_2$ (FIG. 1) develops device *selection* and *address* levels, both having a waveform 296, develops a *request cycle* level, having the waveform 298, and applies one or both of the *read* instruction and *write* instruction waveforms 300 to the memory buss. (The processor develops both instructions only when initiating a dual read/write operation.)

In response to the *await request, request cycle* and device *selection* levels, and assuming there is no "fast memory select" involved, the device selection circuit 156 (FIG. 4) and the priority circuit 158 (FIG. 4) in the addressed memory device develop an *active* signal having the waveform 302. This initiates the new timing cycle, starting with timing pulse $t_0$, waveform 290. The $t_0$ pulse returns the await request flip-flop (FIG. 4) to the ZERO state, as shown in the waveform 294. At a fixed interval after this pulse, the timing distributor (FIG. 6) develops the $t_1$ pulse which, as shown in FIG. 4, produces the *address acknowledge* pulse, waveform 304, that is sent to the processor associated with the *active* signal.

The *address acknowledge* pulse also transfers the read and write instructions into the flip-flops 240, 242 (FIG. 6) of the active memory device and transfers the *location address* signals into that device's memory address register.

When it receives the *address acknowledge* pulse, the processor removes the request cycle level as indicated in waveform 298, as well as the *device select* and *address* levels, waveform 296, and the *read* and *write* instructions shown in waveform 300.

When the memory is to perform a "write only" operation, shortly after receiving the *address acknowledge* pulse, the processor sends the data to be written into the memory and sends out the *write restart* pulse. The data bits typically have a waveform 306 and the *write restart* signal, waveform 314*a*, is sent out simultaneously with them. In response to the *write restart* pulse, the memory transfers the received data from its memory buffer register to the core array.

Also in response to the *write restart* pulse, the memory removes the *active* signal, waveform 302, so that the memory buss is free to handle operations between the processor and another memory device.

When the memory cycle is to perform a *read only* operation, the data read from the memory is applied to the data lines 56 with a waveform 308.

At the same time that it sends data to the processor, the core memory also sends the *read restart* pulse (FIG. 7), having a waveform 312, to the memory control 69 in the processor. Internally, the memory clears the priority flip-flops (FIG. 4) in response to the *read restart* pulse and thereby terminates the *active* signal, waveform 302.

In a read/write operation, data is placed on the data lines, waveform 310*a*, and a *read restart* pulse, waveform 312, developed in the same manner as during a *read only* operation. In addition, however, the *read restart* pulse clears the memory buffer register 238, FIG. 6, as indicated with the dotted waveform 292*b*. Thereafter, when the processor has completed operating on the word read from the core memory array, it sends a *write restart* pulse of waveform 314*b* to the core memory to restart the timing distributor (FIG. 7) and remove the *active* signal (waveform 302). The altered data word is transmitted to the core memory 14 via the data lines 56 as indicated with the waveform 310*b*.

At the end of a memory cycle, signalled by the last timing pulse from the timing distributor, the memory buffer register (FIG. 6) is cleared and the "await request" flip-flop (FIG. 4) is reset to produce an *await request* flag, waveform 294*b*.

The foregoing discussions, such as the description of the transfer of data with a memory device, have made particular reference to transferring a single digit of information. However, it should be understood that in most instances such a single bit is representative of a number of digits that are transferred simultaneously on separate conductors. Thus, in FIG. 6, in the memory buss 10 there may be thirty-six data lines identical to the illustrated line 56*a*, each connected to a transfer circuit as the circuit 268, for transferring digits with memory buffer register 238 stages each having a sense amplifier 244 and a flip-flop 246.

In summary, the digital computing system of the present invention employs a modular arrangement for the input-output section, for the memory section, and for the processor section. Thus, the number of input-output devices operating in such a system can be increased merely by plugging additional units into the in-out buss; the existing system requires minimal alterations to put the new units to use.

The input-output connections between each input-output device and a processor are arranged so that all signals are applied to all devices, but only one or more selected devices are enabled to accept, and hence respond to, signals from the processor.

Likewise, the memory devices are parallel-connected to at least one memory buss and the processor connected to each buss enables only one memory device at a time to transfer binary signals with respect to the buss. As soon as the processor has completed transferring signals with a memory device, the device diables the gating circuits connecting it to the buss so that the buss is usually free for another use while the last memory device to be coupled to it is still executing its memory cycle. As a result, the system can carry out successive instructions with different memory devices with substantial savings in time.

The computing system also transfers binary signals between the input-output devices and the processors, and between the memory devices and the processors, with efficient logic that simplifies programming and minimizes the number of steps, and hence the time, required to execute a logical operation.

Although all conductors in both the input-output buss and the memory buss thus preferably run to every input-output device and to every memory device, respectively, it is not necessary that the device be arranged to transfer signals on every conductor it receives. For example, small capacity devices generally require fewer instruction and data signals than larger devices of the same character.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed as and secured by Letters Patent is:

1. In a data processing system, the combination of:
(A) conductor means for carrying data signal,
(B) selection conductor means for carrying selection signals,
(C) command conductor means for carrying command signals,
(D) first and second input-output devices, each of which has
(1) selection means arranged in circuit with said selection conductor means to develop an active signal when said selection conductor means carries a particular arrangement of selection signals,
(2) first and second storage means, each of which has a storage element and a data terminal and is operable to transfer data between said element and said terminal,
(3) gate means
(a) associated with said storage means and with said selection means in the same device,
(b) arranged to be conditioned by said associated active signal to operate any single one of said associated first and second storage means to transfer data with respect to said data conductor means in response to signals received on said command conductor means.

2. The combination defined in claim 1 in which:
(A) said data conductor means comprises at least first and second data conductors connected with said gate means, and
(B) each input-output device further comprises third and fourth storage means each of which
(1) has a storage element and a data terminal and is operable to transfer data between said element and said terminal,
(2) is so connected with said associated gate means that said first and third storage means simultaneously transfer data in the same direction with said first and second data conductors.

3. A data processing system according to claim 1 in which:
(A) said data conductor means comprises at least a first data conductor connected with both storage means in each of said first and second input-output devices,
(B) each first storage means is operable to read in data from said first data conductor,
(C) each second storage means is operable to read out data to said first data conductor.

4. A data processing system comprising in combination:
(A) an input/output buss having separate conductors for conducting information signals, selection signals, and command signals,
(B) first and second input/output devices, each of which has
(1) selection means parallel-connected with the same selection signal conductors in said buss and arranged to develop an active signal in response to a different combination of selection signals,
(2) first and second storage means
(a) each of which has a storage element and an information terminal,
(b) each first storage means being operable to read in information to its storage element from its information terminal,
(c) each second storage means being operable to read out information from its storage element to its information terminal,
(3) gate means
(a) associated with said selection means and said storage means in the same input/output device, and
(b) arranged to be enabled by said active signal from said associated selection means to operate one of said associated first and second storage means to transfer data with respect to said first data conductor in response to signals received on said command conductors, and
(C) an arithmetic element
(1) connected with said conductors of said input/output buss,
(2) having register means in circuit with said first information signal conductor,
(3) having command means
(a) connected with the command signal conductors in said buss,
(b) operable in a transmit mode to apply to said command conductors a signal causing the enabled gate means to apply to said information conductor an information signal corresponding to the information stored in said second storage means associated with said enabled gate means, and
(c) operable in a receive mode to apply to said command conductors a signal causing the enabled gate means to apply to said first storage means associated with said enabled gate means a signal corresponding to the electrical level of said first information conductor.

5. Apparatus according to claim 4 in which said arithmetic element
(A) further comprises clamping means connected with said first information conductor and normally maintaining it at a selected voltage, and
(B) is arranged to reset the voltage of said information conductor to said selected level at the end of each transmit and each receive operation.

6. A digital data processing system comprising in combination:
(A) an input/output buss having
(1) data lines,
(2) device selection lines, and
(3) command lines, (B) first and second input/output devices, each of which has (1) a decoder having input terminals arranged in circuit with all said selection lines and having an output terminal that is at an active condition only when the signals on said selection lines conform to a selected address, (a) said decoder in said first device responding to a different selected address than said decoder in said second device, (2) a first digital storage element having an input terminal from which data is received for storage, (3) a second digital storage element having an output terminal to which data stored therein is applied, (4) a gate circuit having at least first and second normally disabled stages, (a) each gate circuit being associated with said decoder and said storage elements in the same device, (b) each stage being connected with the output terminal of said associated decoder, and being further connected with a different command line and with the same first data line, (c) said first stage being connected with the input terminal of said associated first storage element responding to the coincidence of said associated active decoder output and at least one command signal to couple to said input terminal of said associated first storage element a voltage corresponding to the voltage of said first data line, (d) said second gating circuit stage being connected with said output terminal of said associated second storage element and responding to the coincidence of said associated active decoder output and at least one command signal to apply to said first data line a voltage corresponding to the voltage at said output terminal of said associated second storage element, and (C) an arithmetic element having:

(1) a selection circuit having output terminals connected with said device selection lines, (2) input-output control means connected to said command lines, (3) a register having a first input terminal and a first output terminal for a first stage therein, and (4) an interface circuit connected between said first data line and said first stage input and output terminals, (a) said interface circuit applying to said first register input terminal the voltage of said data line, (b) said interface circuit being further connected with said input/output control means for responding to a control signal to apply the voltage of said first register output terminal to said data line.

7. In a data processing system having input/output devices and an arithmetic element, the combination of:

(A) a buss connected between said arithmetic element and at least first and second input/output devices, said buss having:

(1) data signal conductors arranged for conducting signals in either direction with respect to said arithmetic element, and (2) instruction signal and address signal conductors, (B) command and address means in said arithmetic element (1) connected with all said instruction and address conductors and applying thereto instruction and address signals, respectively, (C) storage means in each input/output device, (D) gate means in each input/output device and associated with the storage means in the same device, said gate means arranged to transfer binary signals between said associated storage means and said data conductors in response to the signals received on said instruction conductors, and (E) selection means in each input/output device and associated with the gate and storage means in the same device, said selection means being arranged in circuit with said address conductors and enabling said associated gate means when said address conductors carry a selected combination of address signals.

8. A data processing system comprising in combination:

(A) a memory buss having separate data, selection, address, and control conductors, (B) first and second memory devices each of which includes associated, (1) selection means connected with all the selection conductors in said buss, (a) said selection means in said first memory device being conditioned to develop an acknowledge signal in response to a first combination of selection signals, (b) said selection means in said second memory device being conditioned to develop an acknowledge signal in response to a second combination of selection signals, (2) timing means connected with said associated selection means and developing a sequence of timing signals in response to said associated acknowledge signal, (3) an addressable memory, (a) having normally disabled gate means connected with the address, data, and control conductors in said buss, (b) said gate means being enabled in response to said associated acknowledge signals, and (c) the enabled gate means responding to address and control signals to operate said associated memory device and transferring data with respect to the data conductors, (C) further gate means in each memory device arranged in circuit with said associated timing means for causing said associated selection means to remove the acknowedge signal at the time in a memory cycle when transmission of data on said data conductors is complete.

9. A data processing system according to claim 8 in which, following removal of said acknowledge signal, each memory device normally rewrites therein any data transferred from the same memory to the data conductors prior to removal of said acknowledge signal and during the same timing signal sequence.

10. A data processing system according to claim 8

(A) further comprising an arithmetic element having (1) memory address register means connected with said selection and address conductors, (2) memory buffer register means connected with said data conductors, and (3) control means, (a) connected with said control conductors, (b) controlling the transfer of data between said memory buffer register means and said data conductors, and (c) arranged to apply to at least a first control conductor a read signal when data is being transferred from said memory buffer means to said data conductors, and (B) in which each further gate means is connected with said first control conductor.

11. In a data processing system, the combination comprising:

(A) a memory buss having separate conductors for data signals, selection signals, address signals, and control signals, (B) at least first and second memory devices each of which has (1) selection means arranged in circuit with the selection conductors in said buss for developing an active signal only when particular coded signals are received thereon, (2) a memory, (3) control means associated with said selection means and said memory in the same memory device, said control means (a) and said associated memory together being connected with the control conductors in said buss for receiving read, write, and read/write instructions and with the data conductors and address conductors in said buss, (b) being connected with said associated selection means and operating said associated memory according to a memory cycle in response to said associated active signal and at least one of said instructions, (c) developing a read signal when data is transferred from said associated storage element to said data conductors, (d) responding to said read/write instructions for interrupting said memory cycle subsequent to production of said read signal, (e) receiving on said control conductors a write signal and arranged to resume said memory cycle in response thereto, and (C) an arithmetic element (1) connected with said buss, and (2) applying to said control conductors said write signal when data are sent to said memory devices on said data conductors.

12. A data processing system according to claim 11 in which:

(A) said control means responds to a read/write instruction to clear the data stored in said associated memory element in the interval when the memory cycle is interrupted, and (B) said memory device (1) receives a memory address from said address conductors subsequent to said associated active signal and prior to said associated read signal, and (2) retains in memory said memory address during the interval the memory cycle is interrupted.

13. A digital data processing system comprising in combination (A) a memory buss having data conductors, selection conductors, address conductors and control conductors, (B) at least first and second memory devices, each of which (1) is parallel-connected to said memory buss, (2) has an associated selection circuit arranged in circuit with the selection conductors, and developing an active level when said selection conductors carry a particular combination of signals, (3) has an associated timing distributor (a) having a first section operable to develop a first sequence of timing pulses, (b) having a second section arranged in circuit with said first section for developing subsequent to said first sequence of pulses a second sequence of timing pulses, (c) in circuit with said associated selection circuit to initiate operation of said first section in response to said active level, (4) has an associated first register means (a) having a first gate circuit connected with said control conductors for receiving read and write instructions and with said address conductors, (b) in circuit with said associated timing distributor to enable said associated first gate circuit in response to a first timing pulse from said associated first section, (c) having a second gate circuit in circuit with said associated timing distributor to develop a read signal in response to the coincidence of a read instruction and a second timing pulse from said first timing pulse section subsequent to said first timing pulse, (5) has an associated second register means (a) having a third gate circuit connected with said data conductors, (b) in circuit with said associated select circuit to enable said third gate circuit in response to said active level, and (6) has an associated addressable memory connected with said associated first and second register means.

14. A digital data processing system according to claim 13

(A) further comprising an arithmetic element connected to all conductors in said memory buss, said arithmetic element (1) having an address register (a) arranged to apply memory device selection and address signals to said selection and address conductors, respectively, (b) arranged to remove said selection and address signals in response to said first timing pulse, and (2) having gate means connected with a further control conductor and arranged to develop a write signal when data is transferred to said data conductors from said arithmetic element, and (B) in which each memory device is so connected with said further control conductor to remove said active signal from its selection circuit when it receives (1) said read signal and a read instruction is stored in said first register means, and (2) said write signal and a write instruction is stored in said first register means.

15. A digital data processing system according to claim 13 in which each memory device further comprises control means in circuit with its associated tming distributor, said timing distributor and control means (A) responding to the combination of a read instruction and a write instruction received during the same sequence of first timing pulses to initiate operation of said associated timing distributor second section when the associated device receives a restart signal on a selected control conductor.

16. A digital data processing system according to claim 15 in which each timing distributor and conrtol means clears said associated second register means prior to developing said second sequence of pulses when both a read instruction and a write instruction are received during the same sequence of first timing pulses.

17. In a digital data processing system, the combination comprising:

(A) at least first and second memory busses, each of which comprises data conductors, selection conductors, address conductors, and control conductors, (B) at least first and second memory devices parallel-connected with both memory busses, each memory device having (1) selection means
(a) arranged in circuit with the selection conductors in each memory buss for developing a buss-identifying active signal in response to a particular combination of selection signals on a single memory buss,
(2) priority means
(a) storing priority information,
(b) connected to receive said active signals and
(c) developing a request signal identifying the highest priority active buss, and
(3) gate means applying an acknowledge signal to at least one control conductor in said highest priority active buss.

18. A data processing system according to claim 17 in which each priority means has a 'last' circuit that establishes the priority of said first and second busses according to whichever one was the last to be identified as the highest-priority active buss.

19. A data processing system according to claim 17 in which each memory device has disable means connected to disable said selection means therein when the priority means therein develops a request signal.

20. A digital data processing system comprising in combination:
(A) first and second memory busses each of which comprises separate data conductors, selection conductors, address conductors, and control conductors,
(B) first and second memory devices connected to both said memory busses, each memory device having
(1) associated selection means comprising first and second decoding circuits associated respectively with said first and second busses, each decoding circuit being arranged in circuit with the selection conductors of its associated memory buss for developing a buss identifying active signal only in response to a particular combination of select signals,
(2) associated priority means
(a) programmed to assign different priority levels to said memory busses,
(b) connected with said associated selection means to receive said active signals,
(c) developing a request signal identifying the highest priority decoding circuit developing an active signal,
(3) associated timing means connected with said associated priority means and responding to said selection signal to develop a sequence of memory cycle timing pulses, and
(4) a memory
(a) having data input terminals, instruction input signals, and address input terminals,
(b) having first and second gate means connecting said input terminals with the corresponding data, control, and address conductors in said first and second memory busses, respectively, said gate means being normally disabled to electrically isolate said associated memory devices from said memory busses, and
(c) arranged in circuit with said associated priority means to enable the one associated gate means connected with the memory buss identified by said request signal.

21. A data processing system according to claim 20 in which each memory further comprises a bistable disable circuit connected with said decoding circuit therein and further connected to be placed in a first condition in response to said request signal and switched in the second condition in response to a timing pulse from said timing circuit.

22. A data processing system according to claim 20 in which each priority circuit
(A) includes a bistable circuit connected to assume a first state in response to a request signal identifying said first memory buss and to assume a second state in response to a request signal identifying said second memory buss, thereby to store the identity of an identified memory buss, and
(B) arranges the priority levels of said first and second memory busses according to the state of said bistable circuit.

23. A data processing system according to claim 20 in which each priority circuit comprises:
(A) first and second bistable circuits respectively associated with said first and second decoding circuits, each of said first and second bistable circuits being connected to assume a first state in response to an active signal from its associated decoding circuit, and
(B) a third bistable circuit
(1) arranged to store the identity of which of said first and second busses was the last to be identified by a request signal, and
(2) so connected in said associated memory device that when both said associated decoding circuits develop active signals, only one of said first and second circuits maintains said first state, said one circuit being determined by the state of said third bistable circuit.

24. In a data processing system, the combination comprising:
(A) a memory buss having separate data conductors, address conductors, selection conductors and control conductors,
(B) first, second and third memory devices parallel-connected with the conductors of said memory buss,
(1) each memory device having selection means connected with the same selection conductors in said buss,
(2) said first and second memory devices each being further connected with a control conductor and developing an active output signal when it receives a first combination of selection signals and an enabling control signal, and arranged to be enabled by different control signals so that only one of said first and second memory devices develops an active output signal at a time,
(3) said third memory device developing an active output signal when it receives a second combination of selection signals,
(4) each of said memory devices having a memory associated therewith,
(a) said memory in said first memory device having ($n$) addressable locations,
(b) said memory in said second memory device having more than ($n$) addressable locations,
(c) each of said memories having first gate means connected with the same address conductors, the same data conductors and the same control conductors, and
(d) each of said memories operating its gate means in response to the active output sig- from said select means associated therewith,
(C) an arithmetic element
(1) having memory address register means connected with said selection and address conductors of said memory buss and operable to apply selection and address signals thereto,
(2) having second gate means
(a) connecting with said register means therein to receive the address signals for said ($n$) storage locations, (b) developing an assertion output signal therefrom only when said address signals identify an address in said (*n*) locations, (c) applying a signal corresponding to the output signal to said control conductor connected with said first memory device connected with said first selection circuit and to said control conductor connected with said second memory device.

25. A data processing system according to claim 24 further comprising switch means connected with said second gate means and operable to disable said second gate means from developing said assertion signal.

26. Digital data processing apparatus comprising in combination (A) a common set of data and instruction terminals, (B) first and second memory devices, (1) each memory device having data input terminals and instruction input terminals, (2) each memory device having gate means connected between said data and instruction input terminals thereof and said common set of data and instruction terminals, (3) said first memory device having (*n*) addressable memory locations, (4) said second memory device having (*m*) addressable memory locations including (*n*) locations having the same addresses as the (*n*) locations in said first memory device, (C) selection means (1) having terminals for receiving address signals, (2) assuming a first condition when it receives address signals associated with one of said (*n*) locations to (a) operate said gate means in said first memory device to couple said data and instruction input terminals thereof in circuit with said common terminals, and (b) operating said gate means in said second memory device to electrically isolate said data and instruction input terminals thereof from said common terminals, and alternatively (3) assuming a second condition when it receives address signals associated with one of said (*m*) locations other than said (*n*) locations to place the gates in said first memory device in said isolating condition and place the gates in gate means in said second memory device in said coupling condition.

27. Data processing apparatus according to claim 26 further comprising switch means connected with said selection means and operable to produce said second condition when said selection means receives address signals associated with one of said (*n*) memory locations.

28. The combination defined in claim 1

(A) in which each input-output device is arranged to apply first potential to said conductor means when a selected digit is being sent from one of said input-output devices, and (B) further comprising reset means (1) selectively operable to apply a second potential to each conductor means and (2) arranged to maintain each conductor means normally at a third potential intermediate said first and second potentials.

29. An electronic digital data processing system having a processor that controls the transfer of information therein and having also at least first and second memory devices, said system being characterized in that (A) said processor (1) has a set of first, second and third terminals connected to both the first and second memory devices, (2) has address means applying to the first terminals selection signals identifying only the memory device with which the processor is to transfer information, (3) has control means applying to the second terminals control signals for causing said first and second memory devices to perform selected operations, and (4) has register means arranged to transfer data in both directions with said first and second memory devices at said third terminals, (5) said processor control means being arranged to apply to said second terminals a write signal to cause the memory device identified by the selection signals to record data the register means applies to said third terminals, and (B) each of said first and second memory devices (1) is connected to the same first, second and third terminals in each set, (2) has selection means arranged to receive said selection signals and to emit an output signal only when it receives a selected combination of selection signals, (3) has control means connected to respond to said control signals from said processor only when the selection means in the device develops an output signal and further arranged to apply to said processor a read signal to cause said processor to record data the memory device applies to it, (4) has register means connected with said control means in the device and arranged to operate in accordance with the condition of said control means, (5) has gate means arranged to transfer data between said processor third terminals and the register means in the device only when the selection means in the device produces said output signal, and (6) has further gate means receiving said read signal and said write signal and removing the output signal from said selection means in the memory device in response to the last of said read or write signals produced in a memory cycle of the device.

30. A digital data processing system comprising in combination:

(A) a memory buss having first and second memory buss sections each having substantially the same composition of data conductors, selection conductors and address conductors, (B) an arithmetic element (1) connected with one end of said first memory buss section, (2) having data register means and operable to transfer data between said data register means and data conductors of a memory buss section, (3) having address register means and operable to transfer address signals and first selection signals between said address register means and said address conductors and said selection conductors respectively of a memory buss section, (C) first and second memory devices (1) each having first and second parallel-connected terminal means, (a) said first terminal means of said first memory device being connected with the other end of said first buss section, (b) said second terminal means of said first memory device being connected with a first end of said second buss section, (c) said first terminal means of said second memory device being connected with the other end of said second buss section.

(d) so that said first and second memory devices are parallel-connected to said memory buss, (2) each having data storage means, (3) each having address responsive means, (4) each having gate means operatively in circuit between said storage means therein and said first terminal means therein, and (5) each having selection means in circuit with said first terminal means therein to receive said first selection signals and arranged to render said gate means therein in a first condition when it receives a selected combination of first selection signals, (D) an input/output buss having first and second input/output buss sections each having substantially the same composition of data conductors and selection conductors, (E) in which said arithmetic element (1) is connected to a first end of said first input/output buss section, (2) is operable to transfer information between said data register means therein and said information conductors of said input/output buss, and (3) is operable to send second selection signals from said address register means therein to said selection conductor of said input/output buss, (F) first and second input/output devices (1) each having third and fourth parallel-connected terminal means, (a) said third terminal means of said first input/output device being connected to the other end of said first input/output buss section, (b) said second input/output buss section being connected between said fourth terminal means of said first input/output device and said third terminal means of said second input/output device, (c) whereby said first and second input/output devices are parallel-connected with said input/output buss, (2) each having data storage means, (3) each having gate means operatively in circuit between said storage means therein and said third terminal means therein, (4) each having selection means in circuit with said third terminal means therein, to receive said second selection signals and arranged to render said gate means therein in a selection condition when it receives a selected combination of second selection signals.

References Cited

UNITED STATES PATENTS

| | | | |
|---|---|---|---|
| 3,200,380 | 8/1965 | MacDonald | 340—172.5 |
| 3,237,169 | 2/1966 | Hartwig et al. | 340—172.5 |
| 3,254,329 | 5/1966 | Lukoff et al. | 340—172.5 |
| 3,242,467 | 3/1966 | Lamy | 340—172.5 |
| 3,270,325 | 8/1966 | Carter et al. | 340—172.5 |
| 3,283,306 | 11/1966 | Patrusky | 340—172.5 |

ROBERT C. BAILEY, *Primary Examiner.*

R. B. ZACHE, *Assistant Examiner.*